United States Patent
Kimura et al.

(10) Patent No.: US 10,460,164 B2
(45) Date of Patent: Oct. 29, 2019

(54) INFORMATION PROCESSING APPARATUS, INFORMATION PROCESSING METHOD, EYEWEAR TERMINAL, AND AUTHENTICATION SYSTEM

(71) Applicant: SONY CORPORATION, Tokyo (JP)

(72) Inventors: Jun Kimura, Kanagawa (JP); Takeo Tsukamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/606,465

(22) Filed: Jan. 27, 2015

(65) Prior Publication Data

US 2015/0254508 A1    Sep. 10, 2015

(30) Foreign Application Priority Data

Mar. 6, 2014    (JP) .................................. 2014-044135

(51) Int. Cl.
   *G06K 9/00*    (2006.01)
(52) U.S. Cl.
   CPC ....... *G06K 9/00604* (2013.01); *G06K 9/0061* (2013.01); *G06K 9/00617* (2013.01)
(58) Field of Classification Search
   None
   See application file for complete search history.

(56) References Cited

U.S. PATENT DOCUMENTS

| | | | |
|---|---|---|---|
| 4,641,349 A | 2/1987 | Flom et al. | |
| 6,542,624 B1 * | 4/2003 | Oda | G06K 9/00597 382/117 |
| 6,598,971 B2 * | 7/2003 | Cleveland | G06K 9/0061 351/209 |
| 7,796,784 B2 * | 9/2010 | Kondo | G06K 9/00597 382/115 |
| 8,092,021 B1 * | 1/2012 | Northcott | A61B 3/1015 351/206 |
| 8,437,513 B1 * | 5/2013 | Derakhshani | G06K 9/00597 382/115 |
| 8,548,207 B2 * | 10/2013 | Langley | G06F 21/32 382/115 |
| 8,744,140 B2 * | 6/2014 | Baughman | G06F 21/32 351/205 |

(Continued)

FOREIGN PATENT DOCUMENTS

| | | |
|---|---|---|
| EP | 1 139 301 A2 | 10/2001 |
| EP | 1 326 197 A2 | 7/2003 |

(Continued)

OTHER PUBLICATIONS

Wang et al., "An anti-fake iris authentication mechanism for smart glasses", 3rd International Conference on Consumer Electronics Communications and Networks, Nov. 20-22, 2013.*

(Continued)

*Primary Examiner* — Soo Jin Park
(74) *Attorney, Agent, or Firm* — Xsensus LLP

(57) ABSTRACT

There is provided an information processing apparatus including a display control unit configured to, when an authentication image including an iris of an eye of a user is obtained, cause a display unit to display an authentication UI for obtaining an authentication image with which it is easy to perform iris authentication.

20 Claims, 16 Drawing Sheets

(56) References Cited

U.S. PATENT DOCUMENTS

| | | | |
|---|---|---|---|
| 8,750,575 B2* | 6/2014 | Baughman | G06F 21/32 351/205 |
| 8,911,087 B2* | 12/2014 | Publicover | A61B 3/113 351/200 |
| 9,087,238 B2* | 7/2015 | Choi | G06K 9/00617 |
| 9,101,312 B2* | 8/2015 | Waldorf | A61B 3/032 |
| 9,280,706 B2* | 3/2016 | Hanna | G06K 9/00604 |
| 2005/0152583 A1 | 7/2005 | Kondo et al. | |
| 2006/0120707 A1 | 6/2006 | Kusakari et al. | |
| 2009/0220126 A1* | 9/2009 | Claret-Tournier | G06K 9/0061 382/117 |
| 2010/0010317 A1* | 1/2010 | De Lemos | A61B 3/113 600/300 |
| 2010/0010370 A1* | 1/2010 | De Lemos | A61B 3/112 600/558 |
| 2012/0075452 A1* | 3/2012 | Ferren | G02B 13/0065 348/78 |
| 2012/0314048 A1* | 12/2012 | Matos | G06K 9/00 348/78 |
| 2013/0063582 A1 | 3/2013 | Choi et al. | |
| 2013/0088685 A1* | 4/2013 | Holland | G06K 9/00604 351/206 |
| 2014/0044318 A1 | 2/2014 | Derakhshani et al. | |
| 2014/0044321 A1 | 2/2014 | Derakhshani et al. | |
| 2014/0104436 A1* | 4/2014 | Bork | H04N 5/58 348/184 |
| 2014/0186806 A1* | 7/2014 | Hallowell | A61B 3/112 434/167 |
| 2014/0198959 A1 | 7/2014 | Derakhshani et al. | |
| 2014/0282646 A1* | 9/2014 | McCoy | G06K 9/00597 725/12 |
| 2014/0337634 A1* | 11/2014 | Starner | H04L 9/3231 713/186 |
| 2015/0139509 A1* | 5/2015 | Yang | G06K 9/00604 382/117 |
| 2015/0193666 A1 | 7/2015 | Derakhshani et al. | |
| 2015/0282704 A1* | 10/2015 | Maddess | A61B 5/4005 600/558 |
| 2015/0294149 A1* | 10/2015 | Palti-Wasserman | G06F 21/32 382/124 |
| 2015/0294464 A1* | 10/2015 | Kim | G06K 9/00597 382/117 |

FOREIGN PATENT DOCUMENTS

| | | |
|---|---|---|
| EP | 1 457 926 A1 | 9/2004 |
| EP | 2 528 015 A1 | 11/2012 |
| JP | 2000-207536 | 7/2000 |
| JP | 2000-210271 | 8/2000 |
| JP | 2003-108983 | 4/2003 |
| JP | 2004-118627 | 4/2004 |
| JP | 2006-201920 | 8/2006 |
| JP | 2007-6393 | 1/2007 |
| JP | 2008-241822 | 10/2008 |
| JP | 2010-267121 A | 11/2010 |
| WO | WO 86/05018 A1 | 8/1986 |

OTHER PUBLICATIONS

Pacut et al., "Aliveness detection for iris biometrics", Carnahan Conferences Security Technology, Proceedings 2006 40th Annual IEEE International, Oct. 2006.*

Kohn et al., "Color dynamics of the pupil", Ann. NY Acad. Sci. 15, 931-950 1969.*

Daniels et al., "Changes in pupil diameter entrained by cortically initiated changes in attention", VVisual Neuroscience, Mar. 2012.*

Wong et al., "Tracking the allocation of attention using human pupillary oscillations", Journal of Vision (2007) 7(12):3, 1-10.*

Daniels et al., "Changes in pupil diameter entrained by cortically initiated changes in attention", Visual Neuroscience, 0, pp. 1-12, Mar. 2012.*

Extended Search Report dated Jul. 29, 2015 in European Patent Application No. 15151069.0.

John Daugman, "New Methods in Iris Recognition", IEEE Transactions on Systems, Man, and Cybernetics—Part B: Cybernetics, vol. 37, No. 5, Oct. 2007, pp. 1167-1175.

Office Action dated Jun. 30, 2016 in European Patent Application No. 15 151 069.0.

Office Action dated Jan. 31, 2017 in Japanese Patent Application No. 2014-44135.

\* cited by examiner

CHANGING UI DISPLAY

UI IS DISPLAYED CLOSER TO USER

CHANGING UI DISPLAY

SHAPE IS CHANGED

CHANGING UI DISPLAY

UI IS MOVED

CHANGING UI DISPLAY

UI IS CHANGED TO ONE IN WHICH USER IS INTERESTED

CONFIGURATION A

CONFIGURATION B

CONFIGURATION C

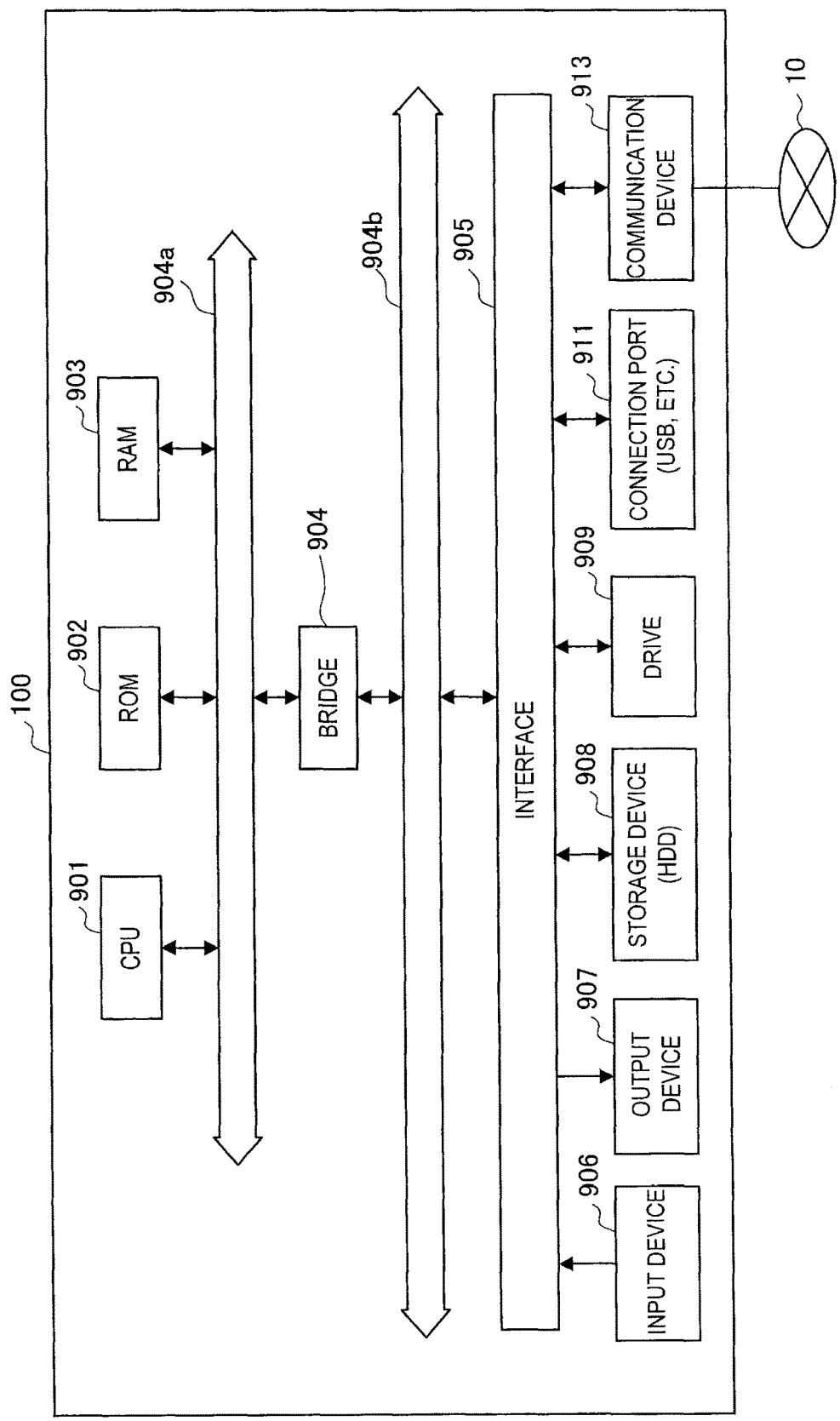

INFORMATION PROCESSING APPARATUS, INFORMATION PROCESSING METHOD, EYEWEAR TERMINAL, AND AUTHENTICATION SYSTEM

CROSS REFERENCE TO RELATED APPLICATIONS

This application claims the benefit of Japanese Priority Patent Application JP 2014-044135 filed Mar. 6, 2014, the entire contents of which are incorporated herein by reference.

BACKGROUND

The present disclosure relates to information processing apparatuses, information processing methods, eyewear terminals, and authentication systems which perform display processing for iris authentication.

Among authentication techniques of identifying an individual is iris authentication, which is a technique of biometric authentication. Iris authentication is a technique of identifying an individual using the annular pattern of the iris, which surrounds the pupil of the eye, and allowing for highly accurate authentication. Iris authentication is, for example, used in authentication for entering a room or logging on to a computer, etc., and in addition, authentication for using a wearable terminal, which is worn by the user when it is used.

For iris authentication, the pupil of a user's eye needs to be correctly recognized. For example, JP 2010-267121A describes a technique of increasing the area of the iris whose image is captured, by providing a line-of-sight directing means above the optical axis of a camera which is used to capture an image of the iris of a user so that the line of sight of the user is reliably directed upward with respect to the optical axis of the camera.

SUMMARY

However, the environment in which the image of the iris is captured varies depending on illumination conditions, etc. In particular, in the case of iris authentication for a wearable terminal, the authentication process may be performed in an outdoor environment, and therefore, the image of the iris is not necessarily clearly captured all the time due to the influence of sunlight, reflected light, etc. Therefore, there is a demand for stable authentication accuracy in various environments.

According to an embodiment of the present disclosure, there is provided an information processing apparatus including a display control unit configured to, when an authentication image including an iris of an eye of a user is obtained, cause a display unit to display an authentication UI for obtaining an authentication image with which it is easy to perform iris authentication.

According to another embodiment of the present disclosure, there is provided an eyewear terminal including an imaging unit configured to obtain an authentication image including an iris of an eye of a user, a display unit configured to cover at least one of eyes of a user, and a display control unit configured to, when the authentication image is obtained, cause the display unit to display an authentication UI for obtaining an authentication image with which it is easy to perform iris authentication.

According to another embodiment of the present disclosure, there is provided an information processing method including causing, by a display control unit, when an authentication image including an iris of an eye of a user is obtained, a display unit to display an authentication UI for obtaining an authentication image with which it is easy to perform iris authentication.

According to another embodiment of the present disclosure, there is provided an authentication system including a device including an imaging unit configured to obtain an authentication image including an iris of an eye of a user, and a display unit configured to cover at least one of eyes of the user, and an information processing apparatus including an authentication unit configured to perform iris authentication using the obtained iris of the authentication image, and a display control unit configured to, when the authentication image is obtained, cause the display unit of the device to display an authentication UI for obtaining an authentication image with which it is easy to perform iris authentication.

According to the present disclosure, when an authentication image of the iris of a user's eye is obtained, the authentication UI is displayed on the display unit to control the size of the pupil of the user. The authentication image thus obtained makes it easier to perform iris authentication, leading to an increase in authentication accuracy.

Note that the effects described above are not necessarily limited, and along with or instead of the effects, any effect that is desired to be introduced in the present specification or other effects that can be expected from the present specification may be exhibited.

BRIEF DESCRIPTION OF THE DRAWINGS

FIG. 16 is a diagram showing an example of a hardware configuration of an information processing apparatus according to the embodiment.

DETAILED DESCRIPTION OF THE EMBODIMENT(S)

Figure 1:
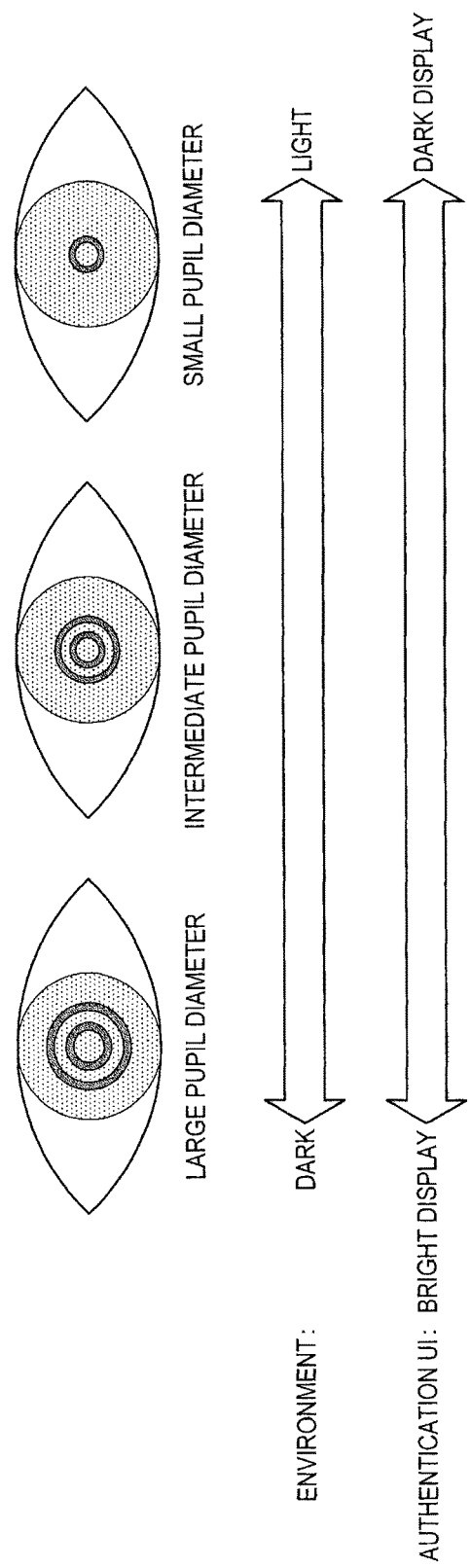
FIG. 1 is an explanatory diagram for outlining changes in UI display in iris authentication according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. Overview of Change in UI Display in Iris Authentication
2. Configuration of Authentication System
3. Iris Authentication Process
4. Variations of Iris Authentication Process
5. Example Configurations of Authentication System
6. Example Hardware Configuration
7. Summary <1. Overview of Change in UI Display in Iris Authentication>

Firstly, changes in UI display in iris authentication according to an embodiment of the present disclosure will be outlined with reference to FIG. 1. Note that FIG. 1 is an explanatory diagram for outlining changes in UI display in iris authentication according to an embodiment of the present disclosure.

Iris authentication is a technique of identifying an individual using the annular pattern of the iris, which surrounds the pupil of the eye. As shown in FIG. 1, the pupil has a larger pupil diameter in a dark environment, and a smaller pupil diameter in a light environment. The pupil diameter typically varies within the range of about 2-8 mm. The contraction and expansion of the iris change the pupil diameter to adjust the amount of light entering the eye.

In iris authentication, in order to make it easier to check an authentication image against a stored image of the iris of each user which is previously obtained for iris authentication, it is desirable to obtain an authentication image having a pupil diameter close to the pupil diameter of the stored image. Therefore, in this embodiment, in order to obtain an authentication image having a pupil diameter close to the pupil diameter of the stored image, an authentication user interface (UI) is displayed which is used to obtain an authentication image which is easy to check, during capturing of an image of the iris. For example, in FIG. 1, in the case of a dark environment in which the pupil diameter becomes large, a brighter authentication UI is displayed so that the pupil diameter becomes smaller to an appropriate size. On the other hand, in the case of a light environment in which the pupil diameter becomes small, a darker authentication UI is displayed so that the pupil diameter becomes larger to an appropriate size.

By displaying the authentication UI to control the pupil diameter in the above manner, authentication images corresponding to various iris sizes or various directions of the line of sight can be obtained. The authentication UI may be any various types of information that can be displayed, such as, for example, an image, object, content, etc. Changes in UI display in iris authentication according to this embodiment will now be described in detail.

<2. Configuration of Authentication System>

Figure 2:
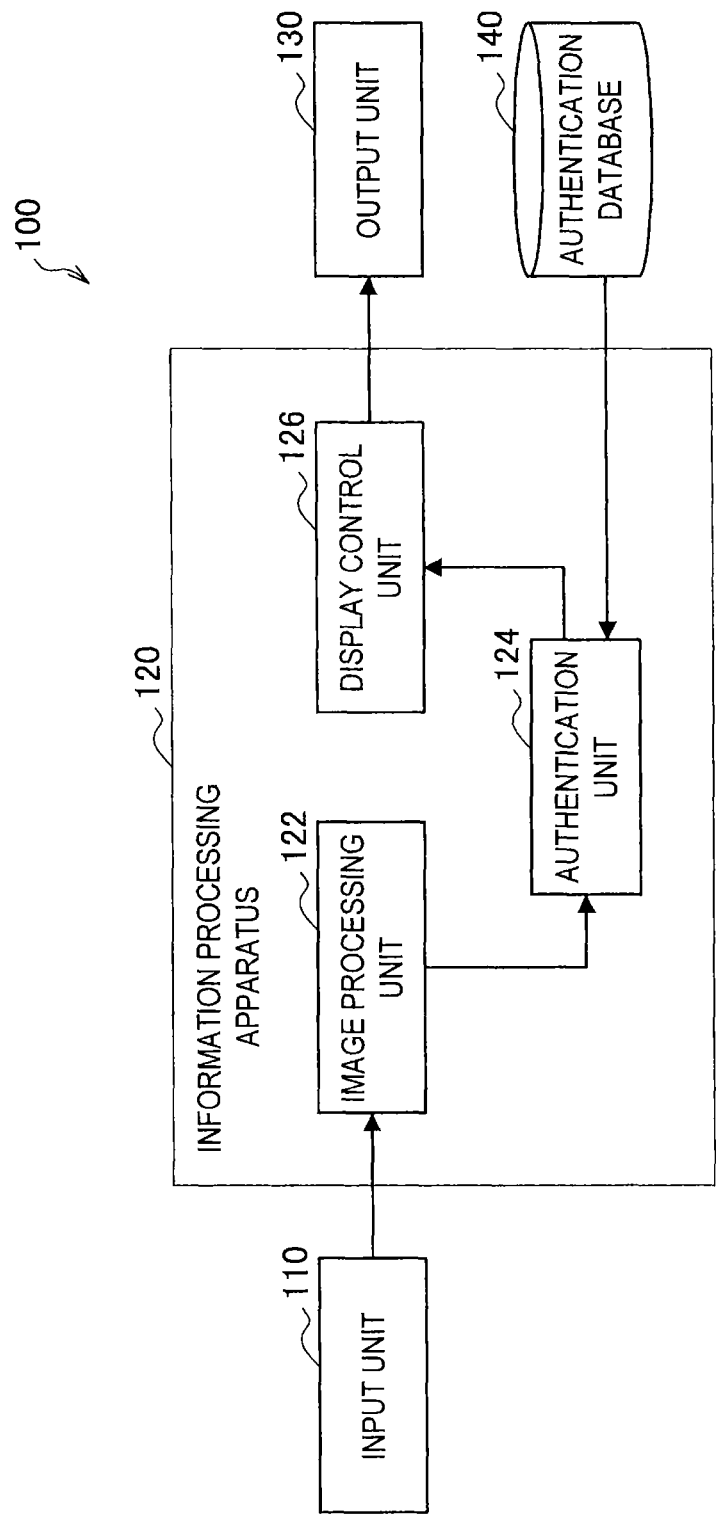
FIG. 2 is a functional block diagram showing a configuration of an authentication system according to the embodiment.

Firstly, a configuration of an authentication system 100 which performs iris authentication according to this embodiment will be described with reference to FIG. 2. Note that FIG. 2 is a block diagram showing a configuration of the authentication system 100 according to this embodiment. As shown in FIG. 2, the authentication system 100 according to this embodiment includes an input unit 110, an information processing apparatus 120, an output unit 130, and an authentication database 140.

The input unit 110 inputs an authentication image which includes the iris of a person to be authenticated to the information processing apparatus 120. The input unit 110 is, for example, an image capture device which obtains an authentication image. In this case, the input unit 110 captures an image of the eye of a person to be authenticated, which includes the iris, and inputs the image as an authentication image to the information processing apparatus 120. The input unit 110 may also be an image database which stores a previously obtained authentication image, and inputs the stored authentication image to the information processing apparatus 120. The authentication image input from the input unit 110 to the information processing apparatus 120 is an image which is captured using visible light or infrared light as illumination.

The information processing apparatus 120 has an authentication function of checking an authentication image against the stored image previously obtained, and a display control function of causing the output unit 130 to display the authentication UI when an authentication image is obtained. Although the information processing apparatus 120 according to this embodiment has these two functions, the present technology is not limited to this example, and the authentication function and the display control function may be provided in different apparatuses. As shown in FIG. 2, the information processing apparatus 120 according to this embodiment includes an image processing unit 122, an authentication unit 124, and a display control unit 126.

The image processing unit 122 performs the process of extracting a pupil and an iris from an authentication image received from the input unit 110. For example, the image processing unit 122 specifies the black part (i.e., the pupil) and white part of an eye included in an authentication image, and specifies the iris based on a boundary portion of the pupil and an inner boundary portion of the white part of the eye.

The authentication unit 124 is an authentication function unit which performs the process of checking an authentication image against the stored image. The authentication unit 124 performs a matching process on an iris included in an authentication image, that has been specified by the image processing unit 122, using the image of an iris stored in the authentication database 140. This iris authentication process may, for example, be performed using Daugman's iris authentication algorithm described in "New Methods in Iris Recognition," IEEE TRANSACTIONS ON SYSTEMS, MAN, AND CYBERNETICS-PART B: CYBERNETICS, VOL. 37, NO. 5, OCTOBER 2007, p 1167-1175.

The display control unit 126 controls displaying of a screen which prompts a person to be authenticated to undergo iris authentication. During iris authentication, the display control unit 126 notifies the person to be authenticated that authentication is being performed, using the authentication UI, and changes the authentication UI to improve the accuracy of iris authentication. Note that the control of displaying of the authentication UI by the display control unit 126 will be described in detail below.

The authentication UI is displayed on the output unit 130 under the control of the display control unit 126. Examples of the output unit 130 include a display device installed separately, a display unit of a smartphone, tablet terminal, eyewear terminal, etc., and the like. The output unit 130 is a screen which is viewed by a person to be authenticated. Note that the display unit of an eyewear terminal may cover either or both of the eyes. The eyewear terminal may be either of the non-transparent type which completely covers the eye or of the transparent type which allows the user to recognize external information. In the authentication system 100 according to this embodiment, an authentication image is obtained while a person to be authenticated is viewing the authentication UI displayed on the output unit 130.

The authentication database 140 stores an image of the iris of each user which is previously captured and obtained. The stored image includes the iris of at least one of the eyes of a user. The image stored in the authentication database 140 is referenced by the authentication unit 124 when the iris authentication process is performed on an authentication image.

<3. Iris Authentication Process>

Figure 3:
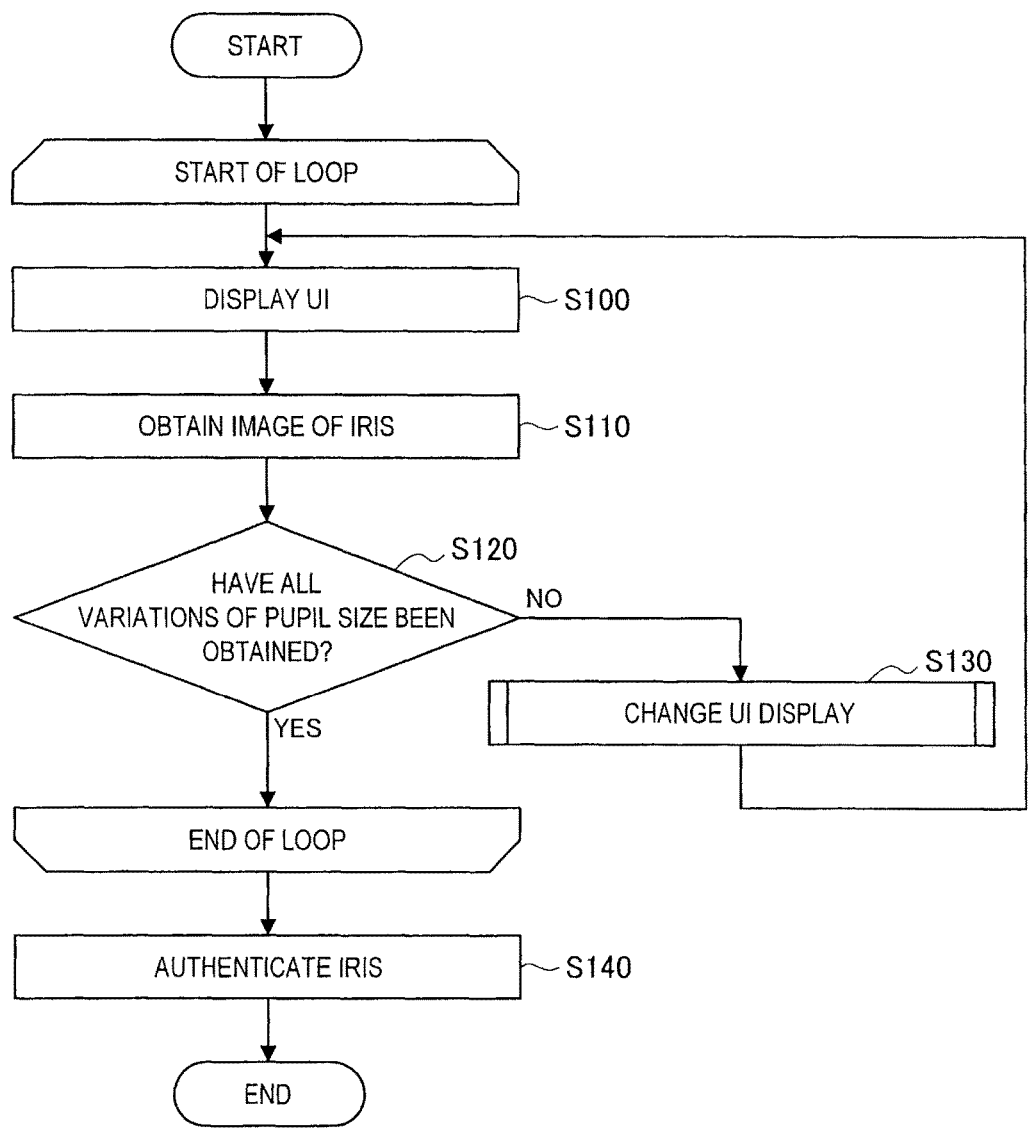
FIG. 3 is a flowchart showing an example authentication process according to the embodiment.
Figure 4:
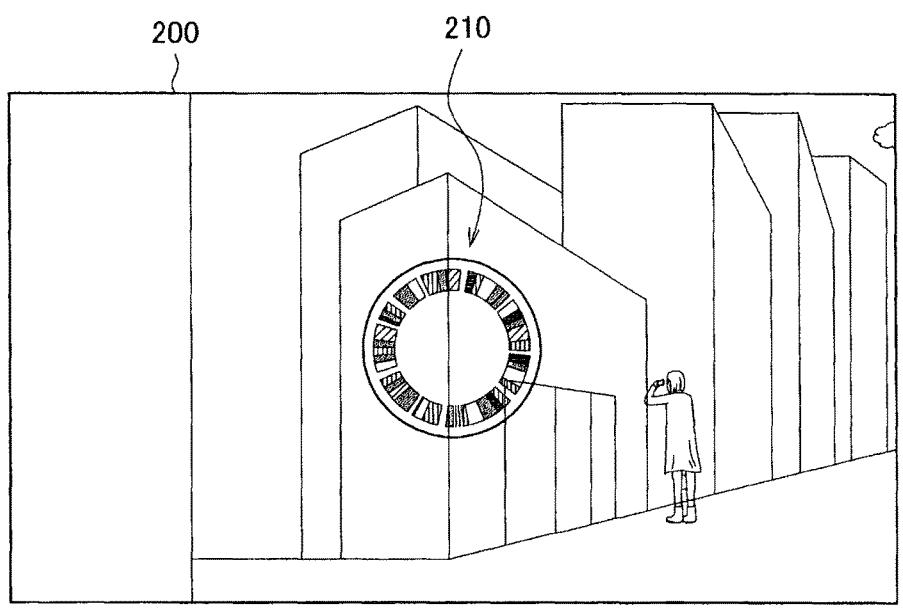
FIG. 4 is an explanatory diagram showing an example authentication UI according to the embodiment.
Figure 5:
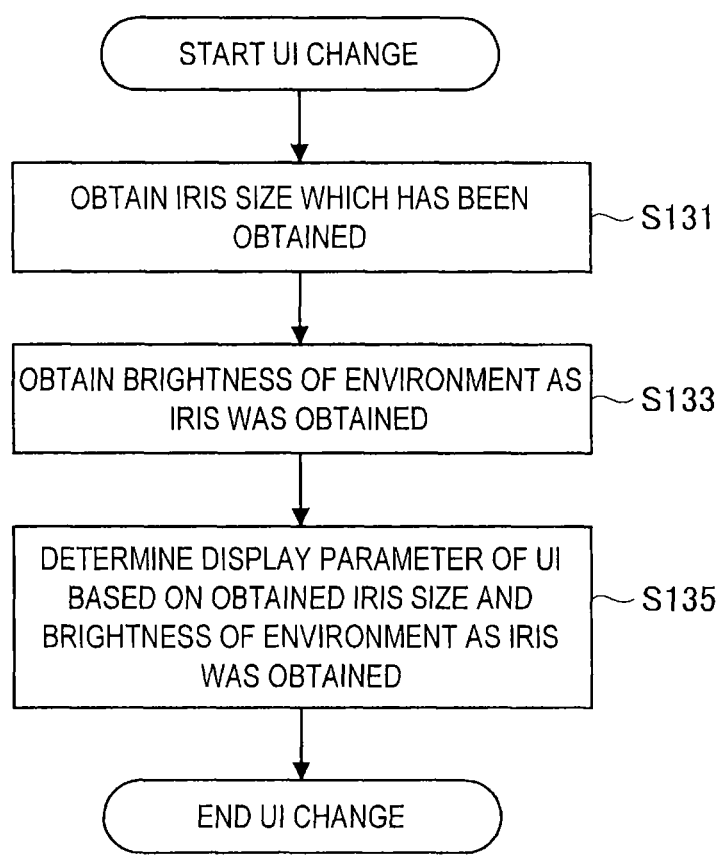
FIG. 5 is a flowchart showing a process of changing the display of an authentication UI according to the embodiment.

Next, an example iris authentication process according to this embodiment will be described with reference to FIGS. 3-11. FIG. 3 is a flowchart showing an example authentication process according to this embodiment. FIG. 4 is an explanatory diagram showing an example authentication UI 210. FIG. 5 is a flowchart showing a process of changing the display of the authentication UI. FIGS. 6-12 are explanatory diagrams showing example changes in the display of the authentication UI.

[S100: Displaying Authentication UI]

The iris authentication process according to this embodiment is started according to an instruction to start the iris authentication process. The authentication system 100 is, for example, notified of the instruction to start the iris authentication process at a timing when the identification of an individual user is required. Specifically, for example, the authentication system 100 is notified of the instruction to start the iris authentication process at a timing, such as when a wearable terminal such as an eyewear terminal, etc., is worn by a user, when a user using a terminal such as a smartphone, etc., requests a service which requires authentication, etc.

As shown in FIG. 3, the display control unit 126, when notified of the instruction to start the iris authentication process, initially causes the output unit 130 to display the authentication UI 210 (S100). The authentication UI 210 is displayed in order to notify a user that the iris authentication process is being performed. For example, as shown in FIG. 4, the authentication UI 210 is displayed in the vicinity of the center of a display area 200 of the output unit 130 while, for example, being superimposed on information which has been displayed before the start of the iris authentication process.

Note that, in step S100, at least the authentication UI 210 may be displayed in the display area 200. In other words, only the authentication UI 210 may be displayed in the display area 200, or for example, information which has been viewed by a user before displaying of the authentication UI 210 may be displayed in the background. Examples of the information which has been viewed by a user include a television program in a case where the output unit 130 is a television, content displayed in an activated browser in a case where the output unit 130 is a smartphone, information which is viewed through a display panel in a case where the output unit 130 is a see-through eyewear terminal, etc.

Also, the size of the iris of a user can be controlled by displaying the authentication UI 210. When the authentication UI 210 is displayed, a user is easily prompted to view the authentication UI 210 in response to a change in display on the output unit 130. Therefore, when the authentication UI 210 is displayed, an image of the eye can be captured while the eye aims for the authentication UI 210 displayed, and therefore, the size of the iris in the captured image can be caused to be closer to a desired size (e.g., the size of an iris in a stored image).

Specifically, the settings of the authentication UI 210 which is initially presented to a user may be determined, taking into consideration, for example, the position, luminance value, display size, etc. The authentication UI 210 may be displayed at a position which is determined based on the default settings, such as the center of the display area 200, a central visual field specified by the process of estimating the line of sight of a user, etc. Alternatively, the authentication UI 210 may be displayed at a position having a high success rate of authentication based on history information of a user stored in the information processing apparatus 120.

The initial luminance value and display size of the authentication UI 210 may be determined by referencing previously calculated display parameter settings optimum to iris authentication based on a luminance value estimated based on ambient light. A relationship between display sizes and estimated luminance values of the authentication UI 210 is previously set based on a collection of average sizes with respect to respective luminance values.

Although, in the example of FIG. 4, the authentication UI 210 is displayed in the vicinity of the center of the display area 200, the present technology is not limited to this example. For example, the position where the authentication UI 210 is initially displayed may be determined based on a relationship in position between the eye of a user and the output unit 130, the direction of the line of sight of a user, etc.

[S110: Obtaining Authentication Image]

Next, an image of the eye of a person to be authenticated is captured as an authentication image (S110). In step S110, the authentication image is obtained by an image capture device which is installed at a position where the image capture device can capture an image of the eye of a person to be authenticated. The image capture device may be the input unit 110 or may be provided separately from the input unit 110. The authentication image may be obtained for only either or both of the eyes. If the authentication image is obtained for both of the eyes, authentication accuracy can be increased. The captured authentication image is input from the input unit 110 to the image processing unit 122.

[S120: Determining Whether or not Authentication Image has been Obtained]

The image processing unit 122 which has received an authentication image extracts an iris from the authentication image. Here, in this embodiment, in order to reliably perform iris authentication, a plurality of authentication images having different pupil sizes (i.e., iris sizes) are obtained before the iris authentication process is performed. By obtaining such different authentication images, at least one of the obtained authentication images may have a pupil size closer to that of the stored image. Therefore, the possibility that an authentication image should be obtained again is reduced, leading to stable authentication accuracy.

The number of authentication images obtained may be suitably set. For example, several authentication images of the pupil having a size of 2-8 mm may be obtained. Alternatively, the number of authentication images obtained may be set based on the time during which the display of the authentication UI 210 is changed as described below.

Also, in this embodiment, it is assumed that obtaining an authentication image includes determining whether or not an image of an iris which can be used for authentication by the image processing unit 122 has been obtained. As a result, it is possible to avoid a situation that none of a predetermined number of authentication images obtained can be used for authentication. Note that the present technology is not limited to the above example. When it is desirable to increase the speed at which the entire iris authentication process is performed, a predetermined number of authentication images may be obtained by changing the authentication UI before iris extraction, iris authentication, etc.

After extracting an iris from an authentication image, the image processing unit 122 determines whether or not the number of authentication images which have been obtained has reached the predetermined value (S120). If, in step S120, it is determined that the number of authentication images which have been obtained is smaller than the predetermined value, the display control unit 126 starts the process of changing the display of the authentication UI 210 (S130).

[S130: Changing Display of Authentication UI]

In step S130, the display control unit 126 changes the display of the authentication UI 210 to change the size of the pupil of a user in order to obtain the predetermined number of authentication images of the pupil having different sizes. In this process, as shown in FIG. 5, the size of the pupil in an authentication image which has already been obtained is obtained (S131). The display of the authentication UI 210 is changed in order to increase the number of sizes of the pupil in authentication images. Therefore, by performing the process of step S131 to check an authentication image and pupil size which have already been obtained, an authentication image of the pupil having the same size is not obtained.

Next, for an authentication image which has already been obtained, the display control unit 126 obtains the brightness of the environment as the authentication image was obtained (S133). As described above, the pupil diameter varies depending on the brightness of the environment. Therefore, the brightness of the environment as the authentication image was obtained can be used as information which is used to set the authentication UI 210 for capturing an image of the pupil having a size which has not been obtained.

After obtaining the pupil size of an authentication image which has already been obtained and the brightness of the environment as the authentication image was obtained, the display control unit 126 determines a new value of a display parameter of the authentication UI 210 based on at least one of these items of information (S135). Here, the display parameter is a parameter which is set in order to change the authentication UI 210, such as, for example, the brightness, the way it is moved, the size, etc. of the authentication UI 210. The display parameter, and changes in pupil size depending on the settings of the display parameter, will now be described.

(A. Brightness)

The pupil size of a user can be adjusted by changing the brightness of the authentication UI. For example, when an authentication image is obtained in a dark environment, then if the authentication UI having a high luminance is displayed on the output unit 130, the pupil size can be decreased. On the other hand, when an authentication image is obtained in a light environment, then if the authentication UI having a low luminance is displayed, the pupil size can be increased. Thus, the pupil size obtained can be adjusted by increasing or decreasing a display parameter related to the "brightness" of the authentication UI.

(B. Depth)

Figure 6:
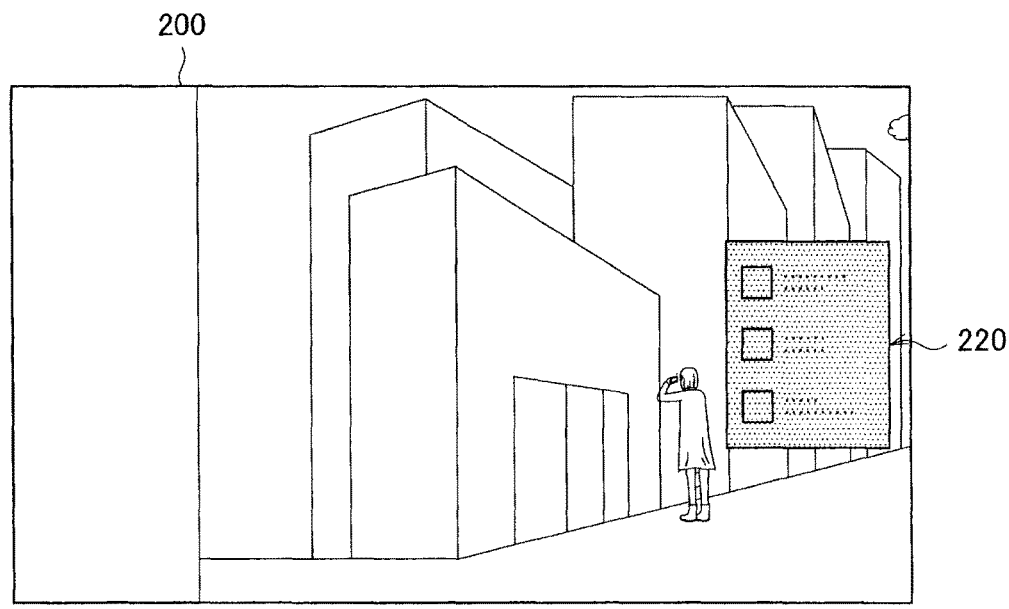
FIG. 6 is an explanatory diagram showing an example change in the display of an authentication UI, where the depth of the authentication UI is changed.
Figure 6:
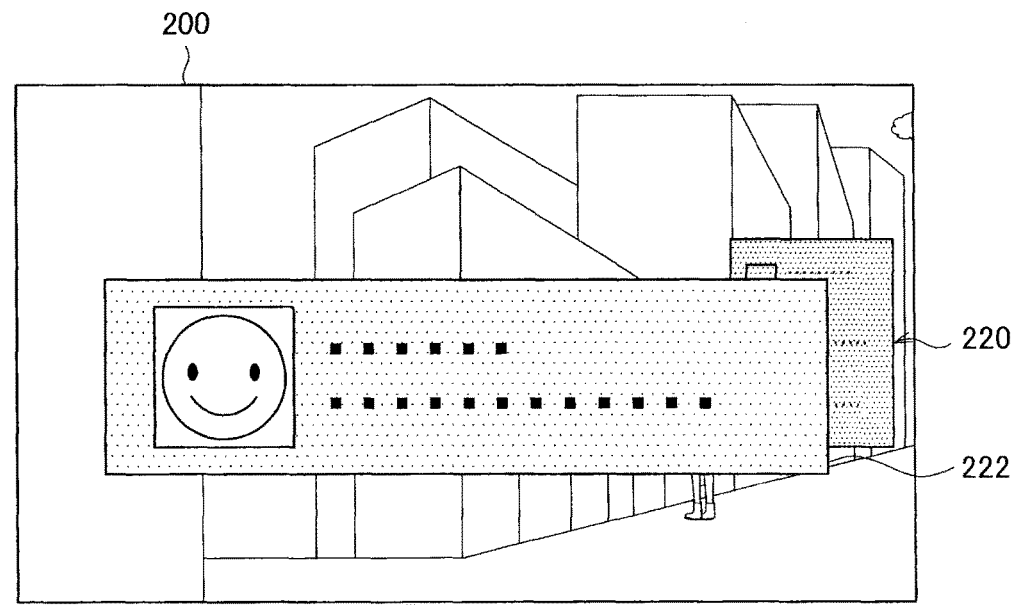
Figure 7:
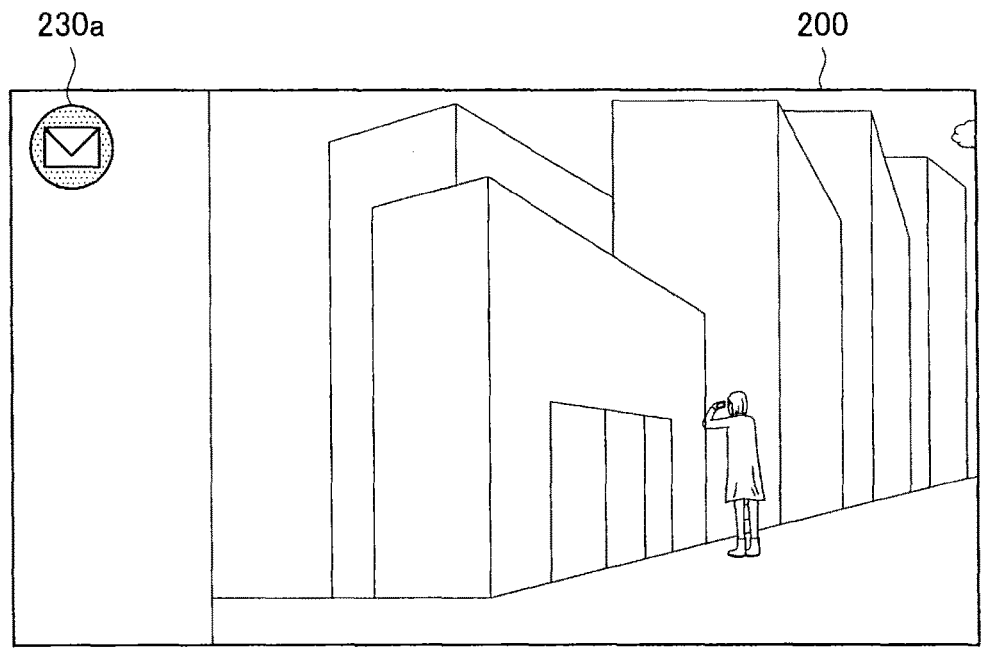
FIG. 7 is an explanatory diagram showing an example change in the display of an authentication UI, where the shape of the authentication UI is changed.
Figure 7:
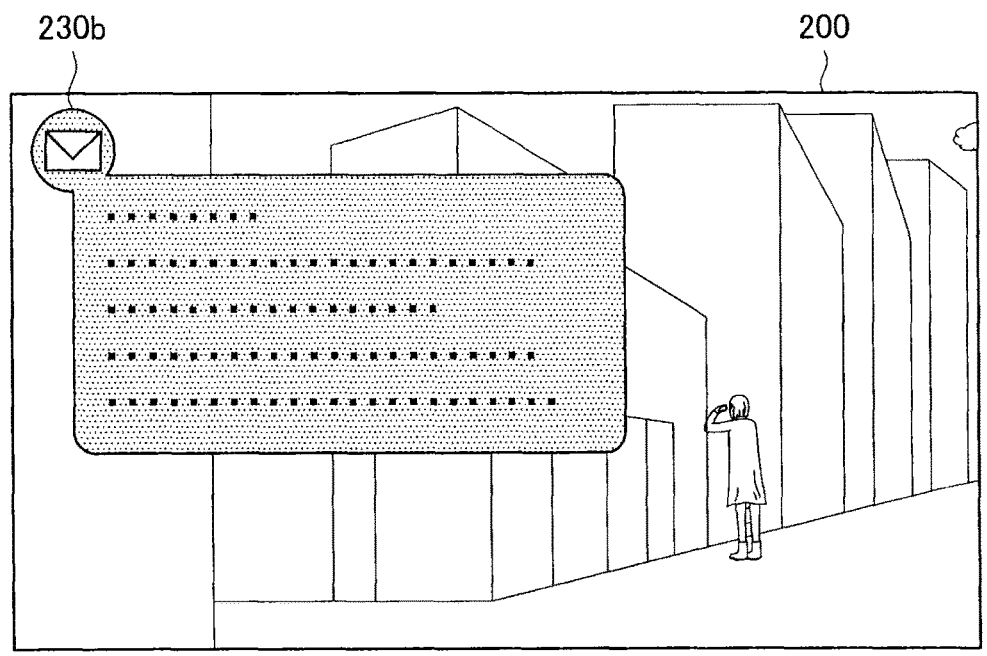

The pupil size of a user can also be adjusted by changing the depth of authentication UI. It is known that the pupil diameter is changed by the focus adjustment function of the eye which is performed during the simultaneous inward movement of both eyes (convergence). Because of this, the pupil diameter can be changed by changing the position in the depth direction where the authentication UI is displayed. For example, as shown in FIG. 6, the display position in the depth direction is changed from the position having a depth of 3 m (or more) where an authentication UI 220 is displayed to the position having a depth of 1.5 m where an authentication UI 222 is displayed. As a result, the authentication UI 222 is displayed closer to a user, and therefore, the pupils of both eyes move inward, so that the pupils become smaller. Thus, the pupil diameter can be changed by changing the position in the depth direction where the authentication UI is displayed.

(C. Changing Shape)

The pupil size of a user can also be adjusted by changing the shape of the authentication UI. For example, as shown in an upper portion of FIG. 7, it is assumed that an object 230a is being displayed as the authentication UI in the display area 200 of the output unit 130. After a predetermined period of time has elapsed, the display control unit 126 expands a portion of the circular object 230a to change the shape with a motion which makes it seem that a generally quadrangular object is generated from the circle, thereby displaying an object 230b which has a different shape as shown in a lower portion of FIG. 7. If a user pays attention to this change in the shape of the object, the pupil diameter is changed according to the change in the shape of the object 230.

Figure 8:
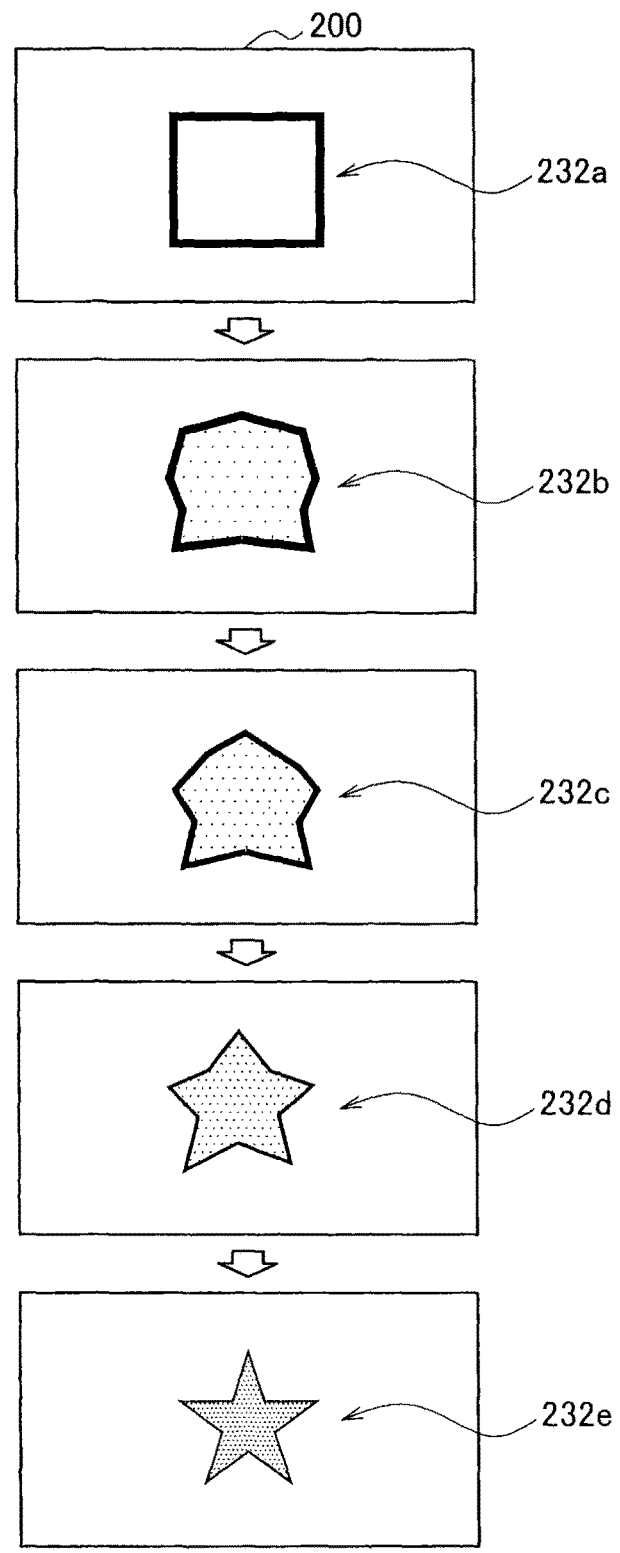
FIG. 8 is an explanatory diagram showing an example change in the display of an authentication UI, where the shape of the authentication UI is changed by morphing.
Figure 9:
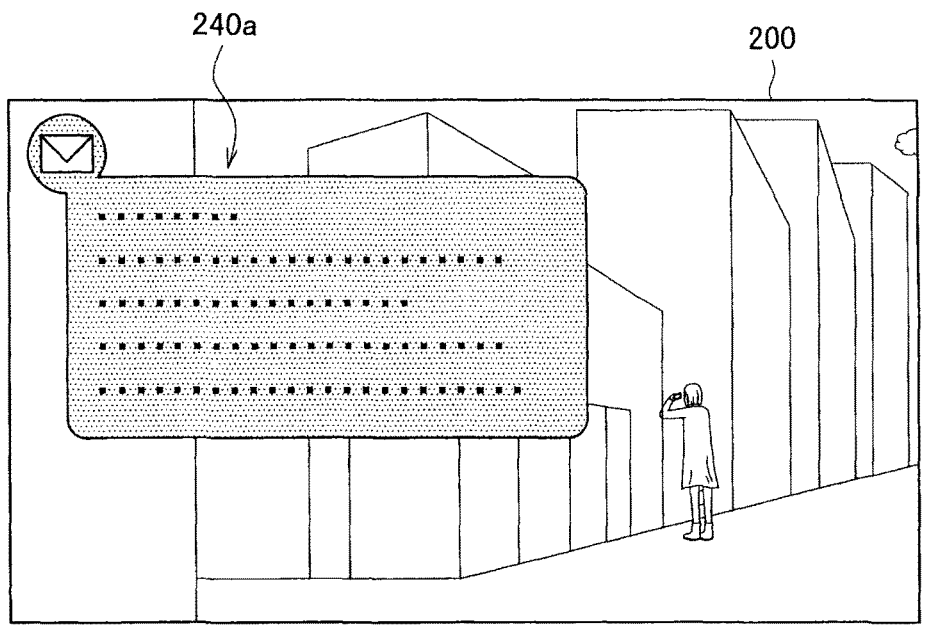
FIG. 9 is an explanatory diagram showing an example change in the display of an authentication UI, where the authentication UI is moved.
Figure 9:
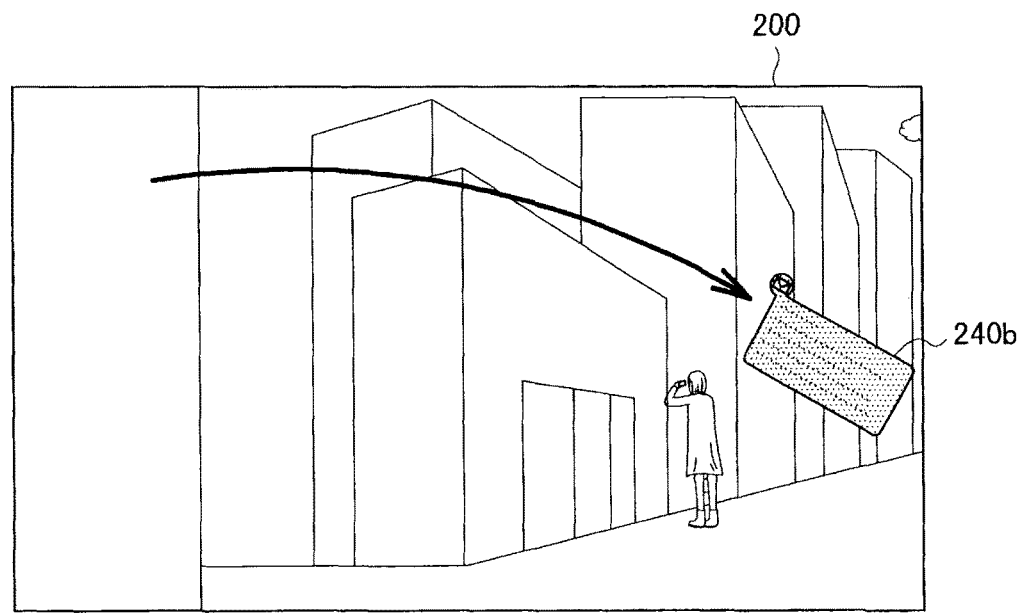
Figure 10:
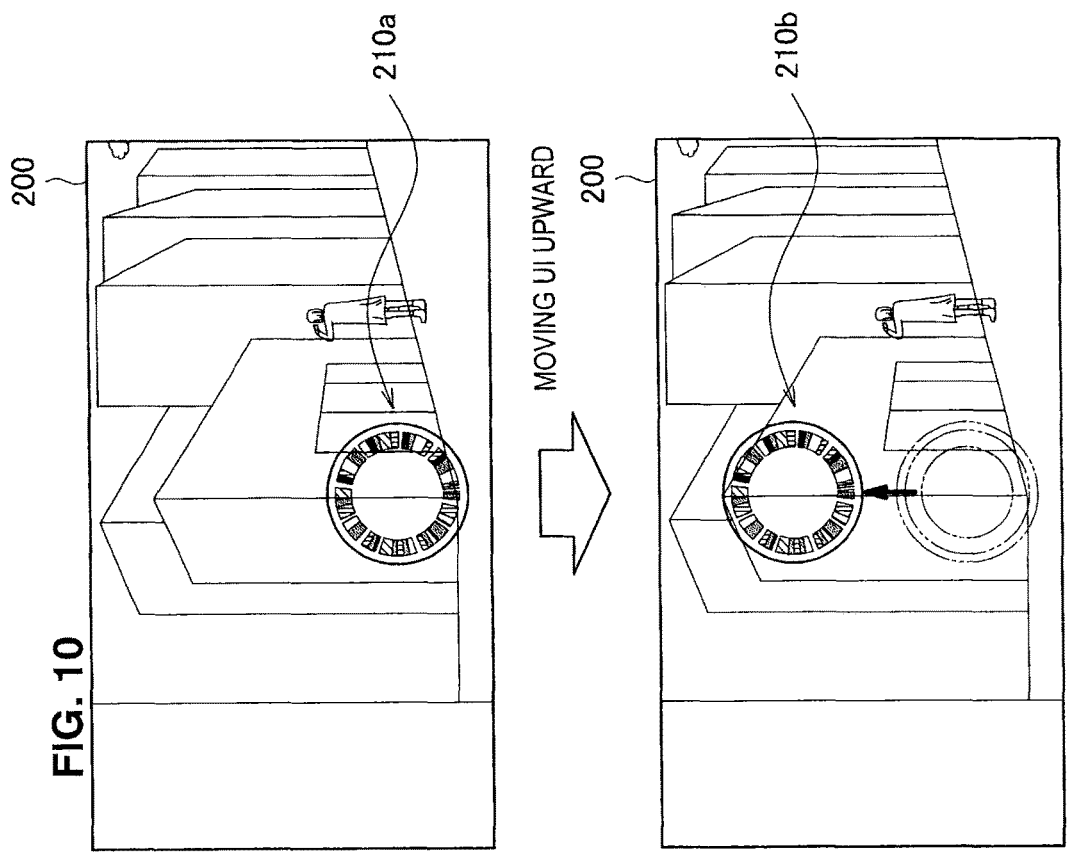
FIG. 10 is an explanatory diagram showing an example change in the display of an authentication UI, where the authentication UI is moved upward.
Figure 10:
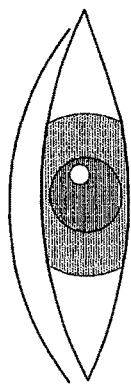
Figure 10:
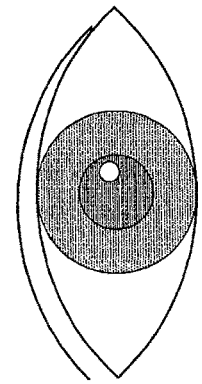

The change in the shape of the authentication UI may, for example, be achieved by changing an object 232 from a quadrangle (object 232a) to a star shape (object 232e) by morphing as shown in FIG. 8. At this time, the color of the object 232 may be changed in addition to the shape, whereby a user's attention can be more reliably attracted. The use of such animation in the authentication UI causes a user to pay attention to the object 232, so that the pupil diameter can be changed according to a change in the shape of the object 232.

(D. Movement) The pupil size of a user may also be adjusted by moving the authentication UI. When the eye is following a moving object, the focus adjustment function is performed with respect to the moving object, so that the pupil diameter is involuntarily changed to a larger or smaller size. For example, as shown in an upper portion of FIG. 9, it is assumed that an object 240a is displayed as the authentication UI in the display area 200 of the output unit 130. After a predetermined period of time has elapsed, the display control unit 126 moves the object 240a which has been displayed in an upper-left portion of the display area 200 to a right portion of the display area 200 while the size of the object 240*a* is gradually decreased, as shown in a lower portion of FIG. 9. Thus, the pupil diameter of a user can be changed by moving the object 240 in the display area 200 so that the eye is caused to follow the object 240.

Note that moving the authentication UI is effective when the eye of a user is not open wide enough, and therefore, an image of the iris which allows for authentication cannot be obtained. For example, as shown in an upper portion of FIG. 10, it is assumed that when an object 210*a* is displayed in a lower central portion of the display area 200 of the output unit 130, an image of the iris which allows for authentication has failed to be obtained. In this case, the display control unit 126 moves the authentication UI to induce the eye of the user to open wider. Specifically, as shown in a lower portion of FIG. 10, the object 210*a* is moved upward, so that an object 210*b* is displayed. As a result, the user raises their line of sight, following the object 210 moving upward, and therefore, the eye can be opened wider.

(E. Displaying Image Attracting Attention)

The pupil size of a user can also be adjusted by changing content displayed on the authentication UI. For example, it is empirically known that when an image in which a user is interested is displayed in the display area 200, the pupil diameter becomes wider than when other images are displayed. Because of this characteristic, the pupil diameter can be controlled by using an image in which a user is interested as the authentication UI.

Figure 11:
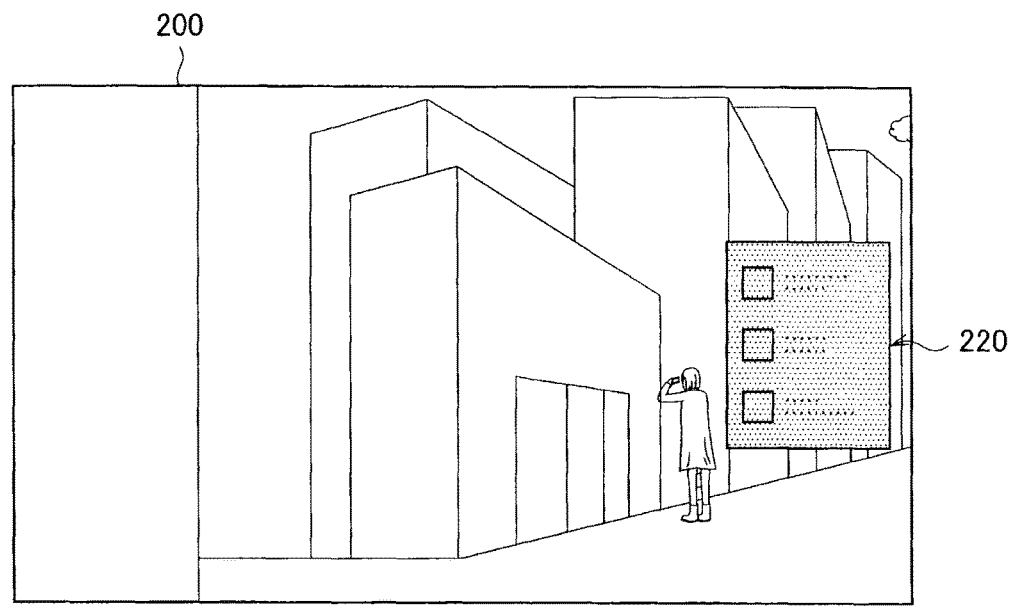
FIG. 11 is an explanatory diagram showing an example change in the display of an authentication UI, where the authentication UI is changed to information in which a user is interested.
Figure 11:
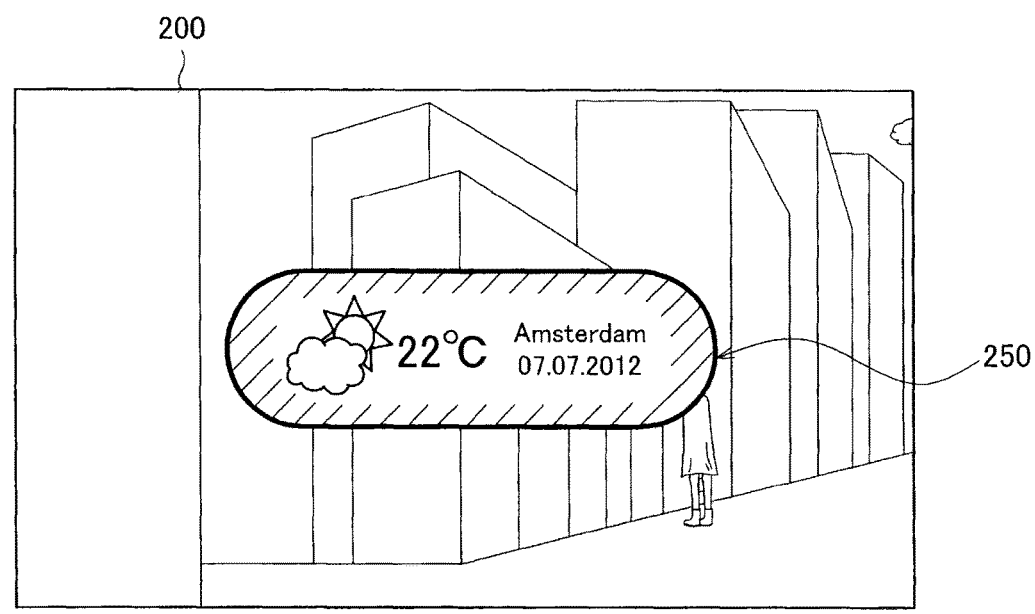

For example, as shown in an upper portion of FIG. 11, it is assumed that an object 220 is displayed as the authentication UI in a right portion of the display area 200. After a predetermined period of time has elapsed, the display control unit 126 switches content displayed in the authentication UI from the object 220 displayed in the right portion of the display area 200 to a weather information object 250 in which a user is interested, as shown in a lower portion of FIG. 11. As a result, the user pays attention to the attracting weather information object 250, so that the pupil becomes larger than when the object 220 is displayed.

Note that an image in which a user is interested is used as the authentication UI, information in which the user is interested is previously obtained. The information in which a user is interested may, for example, be previously set by the user, or may be specified by managing a history, such as a television program or content which the user has frequently viewed, an application which the user has frequently used, etc.

Note that the above display parameters are merely illustrative, and the authentication UI may be changed using other display parameters. The number of display parameters of the authentication UI which are changed is not limited to one, and a plurality of display parameters may be simultaneously changed, or a plurality of parameters may be suitably combined and sequentially changed to change the authentication UI.

Figure 12:
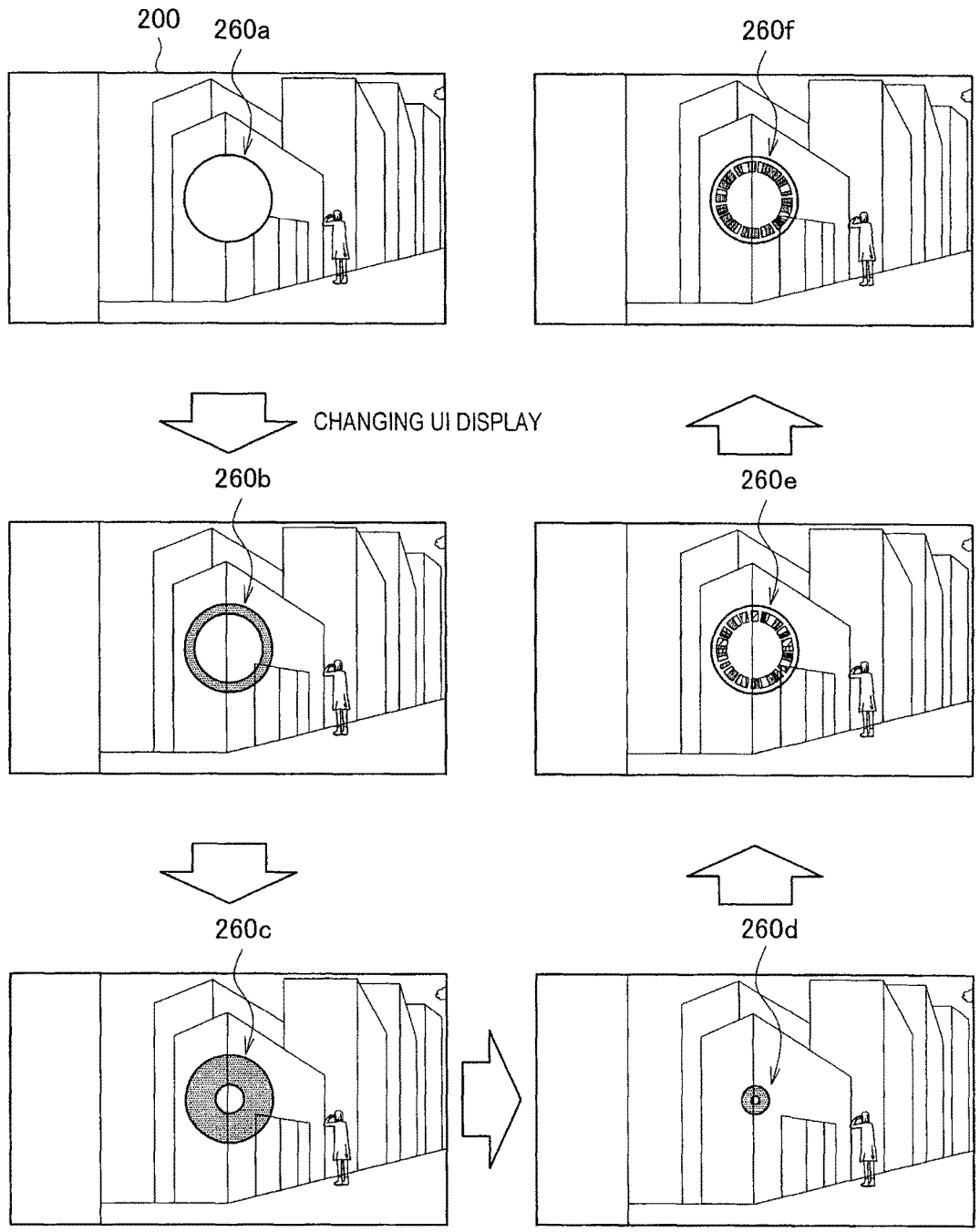
FIG. 12 is an explanatory diagram showing an example change in the display of an authentication UI, where the authentication UI are gradually changed by changing a plurality of display parameters for the authentication UI.

FIG. 12 shows an example display in which the authentication UI is sequentially changed by changing a plurality of display parameters. As shown in an upper-left portion of FIG. 12, for example, it is assumed that a white circular object 260*a* is displayed as the authentication UI in the vicinity of the center of the display area 200. The object 260*a* is a bright display having a high luminance value. The display control unit 126 changes the object 260*a* with time. For example, firstly, a region having a different color is gradually increased, extending from an outer circumferential side of the white circular object 260*a* to the center of the circle. The different color of the region is assumed to be darker than white. The region is increased to an object 260*b* and then an object 260*c* in a sequence, so that the luminance value of the entire object which is viewed by a user decreases, resulting in a dark display.

Thus, the pupil diameter of a user can be changed by changing the luminance of the objects 260*a*-260*c*. The shape of the object 260 is also changed, which can attract the attention of a user, and therefore, the line of sight of a user can be kept directed to the object 260. Therefore, a generally true-circular pupil with which it is easy to perform iris authentication can be stably obtained.

Moreover, after the object 260*c* has been displayed, the display control unit 126 displays an object 260*d* having the same shape and a reduced size compared to the object 260*c*. The change in size of the object 260 can also change the pupil size.

The display control unit 126 also changes the size of the object 260*d* back to the original size, and thereafter, displays annular objects 260*e* and 260*f*. The objects 260*e* and 260*f* are, for example, circumferentially sectioned at random. The display control unit 126 controls the display colors of regions obtained by the sectioning of the objects 260*e* and 260*f* so that at least a portion of the regions have a different color. In this case, for example, the display control unit 126 uses many light colors in the object 260*e* to provide an entirely light display, and gradually decreases the luminance value and the number of colors, and eventually provides an entirely dark display in the object 260*f*. Thus, the pupil diameter can be changed by changing the brightness of the objects 260*e* and 260*f*.

By gradually changing the display of the object 260 which is the authentication UI as shown in FIG. 12, the size of the pupil diameter of a user viewing the object 260 can be controlled, and meanwhile, a plurality of authentication images having different pupil sizes can be obtained. Changes in the object 260 during this process are set by repeatedly performing the process of FIG. 5 until a predetermined number of authentication images have been obtained. Therefore, the period of time during which the authentication UI is displayed is set to a period of time during which the predetermined number of authentication images can be obtained. However, for example, the predetermined number of authentication images may be obtained for only about several seconds in some cases. In this case, a user only needs to view the object 260, leading to a decrease in burden on the user during authentication.

[S140: Iris Authentication]

Referring back to FIG. 3, if, in step S120, the predetermined number of authentication images have been obtained, the authentication unit 124 performs an iris authentication process based on the authentication images (S140). The authentication unit 124 performs a matching process on irises in the authentication images specified by the image processing unit 122 using the iris image stored in the authentication database 140. In the iris authentication of step S140, the process may be ended at the time when any one of the authentication images obtained in step S110, that matches a stored image, is found.

The authentication unit 124, when the iris authentication process has been completed, performs a predetermined process, depending on whether or not the identification of an individual has been successful. For example, if the identification of an individual has been successful, the execution of a process requested by the user (e.g., accessing a website which only a specific user is allowed to browse, etc.) is started. On the other hand, if the identification of an individual has failed, the user is notified of a message indicating the failure of the authentication, or is prompted to register, for example.

The iris authentication process according to this embodiment has been described above. According to this embodiment, when an authentication image for iris authentication is obtained, the authentication UI is displayed to obtain images having different pupil diameters. The display control unit 126 changes the display of the authentication UI by changing a display parameter(s) of the authentication UI, such as the brightness, shape, motion, etc., depending on the brightness of the environment in which the images are captured. As a result, iris authentication can be performed without requiring a user to perform an explicit operation.

Also, because a plurality of authentication images are obtained, a situation that the iris authentication process cannot be performed due to image blur caused by shaking or eye movement during image capture, can be reduced or prevented. Also, because a plurality of images having different pupil diameters are obtained, the accuracy of iris authentication can be increased.

<4. Variations of Iris Authentication Process>

In the iris authentication process described with reference to FIG. 3, a plurality of authentication images having different pupil diameters are previously obtained, and thereafter, iris authentication is performed using all of the authentication images. The present technology is not limited to this example. For example, each time the authentication UI is changed, iris authentication may be performed using an obtained authentication image.

Figure 13:
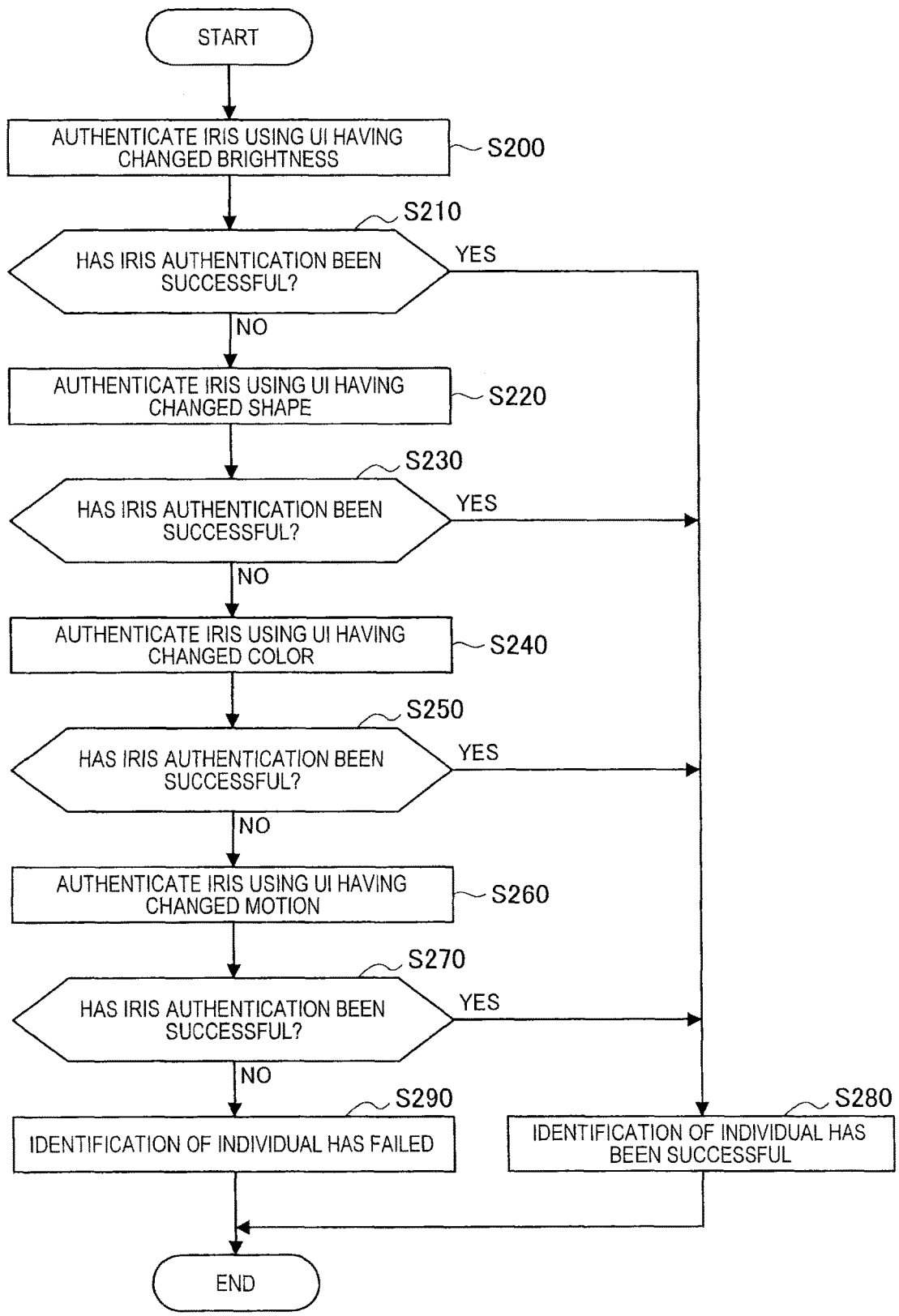
FIG. 13 is a flowchart showing another example authentication process according to the embodiment, where iris authentication is performed each time the display of an authentication UI is changed.

FIG. 13 shows an example process of performing iris authentication using an obtained authentication image each time the authentication UI is changed. In this process, while some authentication UIs are sequentially displayed, iris authentication is performed each time an authentication UI is displayed. The authentication process is ended at the time when the authentication has been successful. Note that, in FIG. 13, the process of obtaining an authentication image and the process of changing the display of the authentication UI are similar to the processes of steps S110 and S130, respectively, of FIG. 3. Here, these processes will not be described in detail.

For example, firstly, as shown in FIG. 13, authentication images are obtained by changing the brightness (i.e., the luminance value) of the authentication UI, and iris authentications are performed using the obtained authentication images (S200). When the image processing unit 122 has extracted an iris from an authentication image received from the input unit 110, the authentication unit 124 performs a matching process on the iris and the image stored in the authentication database 140. If, as a result, the authentication has been successful (YES in S210), it is determined that the identification of an individual has been successful, and the execution of a process requested by the user (e.g., accessing a website which only a specific user is allowed to browse, etc.) is started (S280).

On the other hand, if, in step S210, the authentication has not been successful, the display control unit 126 changes the authentication UI. For example, the shape of the authentication UI is changed (S220). In this case, the display control unit 126 performs a control to change the shape of the authentication UI according to the process of FIG. 5 in order to obtain an authentication image having a pupil diameter different from that which has been obtained in step S200. Thereafter, the image processing unit 122 extracts an iris from the authentication image which has been obtained using the authentication UI having a changed shape, and the authentication unit 124 performs a matching process on the iris and the image stored in the authentication database 140. If, as a result, the authentication has been successful (YES in S230), it is determined that the identification of an individual has been successful, and the execution of a process requested by the user is started (S280).

On the other hand, if, in step S230, the authentication has not been successful, the display control unit 126 changes the authentication UI. For example, the color of the authentication UI is changed (S240). The display control unit 126 performs a control to change the color of the authentication UI according to the process of FIG. 5 in order to obtain an authentication image having a pupil diameter different from those which have been obtained in steps S200 and S220. Thereafter, the image processing unit 122 extracts an iris from an authentication image which has been obtained using the authentication UI having a changed color, and the authentication unit 124 performs a matching process on the iris and the image stored in the authentication database 140. If, as a result, the authentication has been successful (YES in S250), it is determined that the identification of an individual has been successful, and the execution of a process requested by the user is started (S280).

On the other hand, if, in step S250, the authentication has not been successful, the display control unit 126 changes the authentication UI. For example, the motion of the authentication UI is changed (S260). In this case, the display control unit 126 performs a control to change the shape of the authentication UI according to the process of FIG. 5 in order to obtain an authentication image having a pupil diameter different from those which have been obtained in steps S200, S220, and S240. Thereafter, the image processing unit 122 extracts an iris from the authentication image which has been obtained using the authentication UI having a changed motion, and the authentication unit 124 performs a matching process on the iris and the image stored in the authentication database 140. If, as a result, the authentication has been successful (YES in S270), it is determined that the identification of an individual has been successful, and the execution of a process requested by the user is started (S280).

On the other hand, if, in step S270, the authentication has not been successful, the user is notified that the identification of an individual has failed (S290). In this case, for example, the user may be notified of a message indicating the failure of the authentication, or is prompted to register, for example.

Thus, iris authentication is performed each time the authentication UI is changed, whereby when the authentication has failed, an authentication image having a different pupil diameter is obtained and the iris authentication process is performed again, resulting in an increase in authentication accuracy. Also, the authentication UI is changed, taking into consideration the brightness of the environment as the authentication failed, the size of an iris in the authentication image at that time, etc., whereby an image with which it is easier to perform authentication can be obtained.

<5. Example Configurations of Authentication System>

Figure 14:
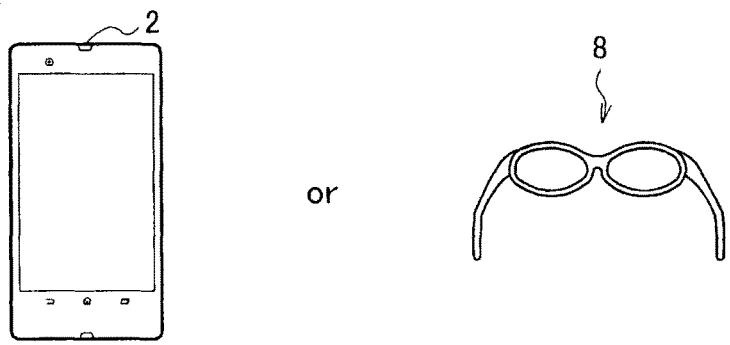
FIG. 14 is an explanatory diagram showing example configurations A-C of an authentication system according to the embodiment.
Figure 14:
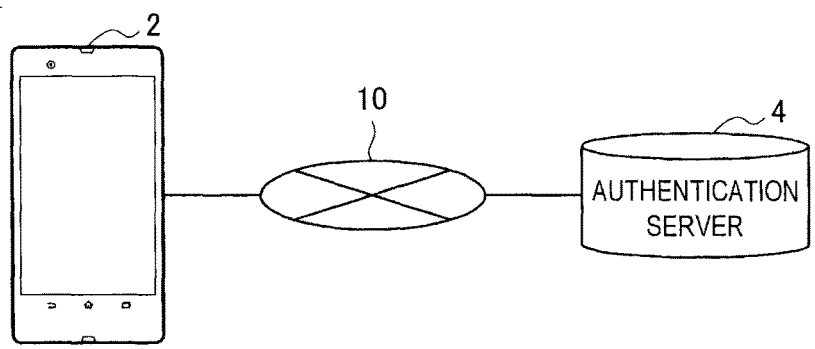
Figure 14:
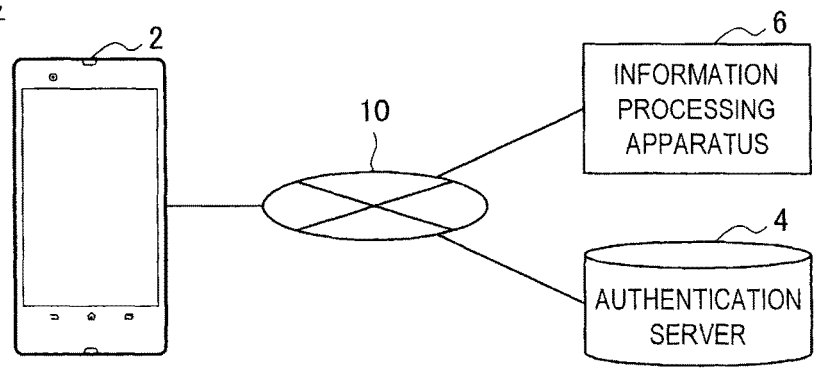
Figure 15:
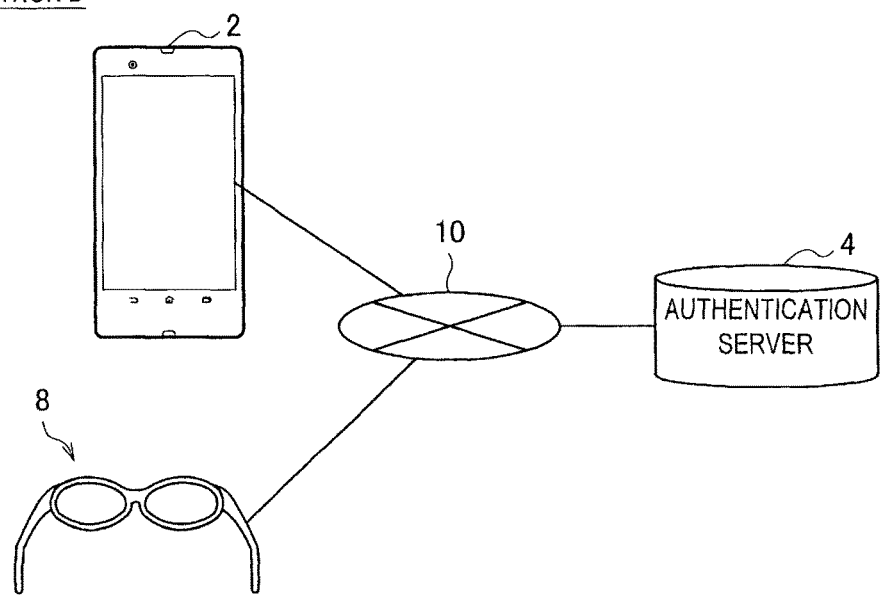
FIG. 15 is an explanatory diagram showing example configurations D and E of an authentication system according to the embodiment.
Figure 15:
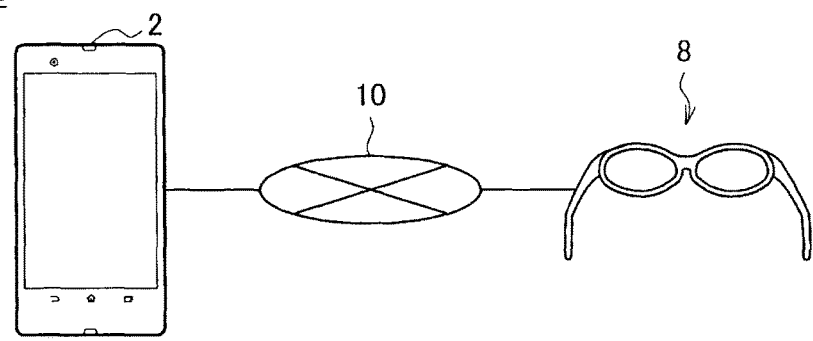

Example configurations of the authentication system 100 described above will now be described. FIGS. 14 and 15 show example configurations of the authentication system 100.

Firstly, as shown as a configuration A in FIG. 14, the authentication system 100 may be implemented using only an apparatus used by a user, such as a smartphone 2, a wearable terminal (e.g., an eyewear terminal 8), etc. In this case, the individual apparatus includes an imaging unit (input unit) which captures an image of the eye of a user. An information processing apparatus provided in the individual apparatus performs an authentication process using an authentication image obtained by the imaging unit. When an authentication image is obtained, the authentication UI is displayed on a display unit of the individual apparatus.

Also, as shown as a configuration B in FIG. 14, the authentication system 100 may be implemented using an apparatus, such as a smartphone 2, a wearable terminal (e.g., an eyewear terminal 8), etc., and an authentication server 4 which includes an authentication database which stores an image used for iris authentication, where the individual apparatus and the authentication server 4 are connected together through a network. In this case, the individual apparatus includes an imaging unit (input unit) which captures an image of the eye of a user. An information processing apparatus provided in the individual apparatus performs an authentication process using an authentication image obtained by the imaging unit. During the iris authentication process, the individual apparatus obtains a stored image from the authentication server 4 through the network 10. When a stored image is obtained from the authentication server 4, the stored image may be encrypted. When an authentication image is obtained, the authentication UI is displayed on a display unit of the individual apparatus.

Also, as shown as a configuration C in FIG. 14, the authentication system 100 may be implemented using an apparatus, such as a smartphone 2, a wearable terminal (e.g., an eyewear terminal 8), etc., an authentication server 4, and an information processing apparatus 6 which performs an authentication process, where the apparatus, the authentication server 4, and the information processing apparatus 6 are connected together through a network. In this case, the individual apparatus includes an imaging unit (input unit) which captures an image of the eye of a user. Authentication images obtained by the imaging unit are output to the information processing apparatus 6 through the network 10. When an authentication image is obtained, the authentication UI is displayed on a display unit of the individual apparatus.

The information processing apparatus 6 extracts an iris from an authentication image received from the individual apparatus, and performs an authentication process by referencing an image stored in the authentication server 4. The information processing apparatus 6 also determines a display parameter for changing the authentication UI displayed on a display unit of the individual apparatus based on the brightness of the environment in which the authentication image has been obtained, the pupil diameter of the obtained authentication image, etc., and outputs the display parameter to the individual apparatus. Note that information exchanged through the network 10 is preferably encrypted.

Also, as shown as a configuration D in FIG. 15, the authentication system 100 may be implemented using a smartphone 2, a wearable terminal (e.g., an eyewear terminal 8), and an authentication server 4 which includes an authentication database which stores an image used for iris authentication, where the smartphone 2, the wearable terminal, and the authentication server 4 are connected together through a network. In this case, for example, an imaging unit (input unit) is provided in the eyewear terminal 8, and the smartphone 2 which has the functionality of the information processing apparatus 120 of FIG. 2 performs the iris authentication process. During the iris authentication process, the smartphone 2 obtains a stored image from the authentication server 4 through the network 10.

When an authentication image is obtained, the authentication UI is displayed on a display unit of the eyewear terminal 8. The information processing apparatus of the smartphone 2 determines a display parameter for changing the authentication UI displayed on the display unit of the eyewear terminal 8 based on the brightness of the environment in which the authentication image has been obtained, the pupil diameter of the obtained authentication image, etc., and outputs the display parameter to the eyewear terminal 8. Note that information exchanged through the network 10 is preferably encrypted.

Also, as shown as a configuration E in FIG. 15, the authentication system 100 may be implemented using a smartphone 2 and a wearable terminal (e.g., an eyewear terminal 8), where the smartphone 2 and the wearable terminal are connected together through a network. The configuration E is the same as the configuration D, except that the functionality of the authentication server 4 of the configuration D is provided in the smartphone 2. Specifically, the eyewear terminal 8 includes an imaging unit (input unit), and the smartphone 2 which has the functionalities of the information processing apparatus 120 and the authentication database 140 of FIG. 2 performs the iris authentication process. Information exchanged through the network 10 is preferably encrypted.

The authentication system 100 may have various other configurations in addition to the above configurations A-E. The authentication system 100 may also be applied to, for example, an electronic viewfinder (EVF) of a camera, an iris authentication apparatus mounted in a car, etc., in addition the smartphone 2, the wearable terminal such as the eyewear terminal 8, etc., described above.

When the above iris authentication process is, for example, applied to the eyewear terminal 8, the iris authentication process may be caused to start with detection of the act of putting on the eyewear terminal 8 itself. Also, in the case of the EVF of a camera, etc., the iris authentication process may be caused to be start with obtaining of an image of an eye using a user's act of looking through the EVF. In this case, when the identification of an individual has been successful, the settings of the camera may be automatically adjusted based on information which has been previously set by the identified user, for example.

In the case of the smartphone 2, etc., the iris authentication process may be caused to start with obtaining of an image of an eye using a built-in camera of the smartphone 2 at the timing when the smartphone 2 is unlocked. In the case of an iris authentication apparatus mounted in a vehicle, the iris authentication process may be performed with obtaining an image of an eye at the timing when a user sits on the driver's seat, for example. In this case, when the identification of an individual has been successful, the settings, such as the height, fore-and-aft direction, etc., of the seat may be automatically adjusted based on information which has been previously set by the identified user, for example.

<6. Hardware Configuration Example>

The processing by the information processing apparatus 120 according to the aforementioned embodiment can be executed by using hardware or software. In this case, the information processing apparatus 120 can be configured as illustrated in FIG. 16. Hereinafter, an example of a hardware configuration of the information processing apparatus 120 will be described based on FIG. 16.

The information processing apparatus 120 can be implemented by a processing apparatus such as a computer, as described above. As illustrated in FIG. 16, the information processing apparatus 120 includes a central processing unit (CPU) 901, a read only memory (ROM) 902, a random access memory (RAM) 903, and a host bus 904a. The information processing apparatus 120 also includes a bridge 904, an external bus 904b, an interface 905, an input device 906, an output device 907, a storage device (hard disk drive) 908, a drive 909, a connection port 911, and a communication device 913.

The CPU 901 functions as an arithmetic processing unit and a control unit, and controls overall operation of the information processing apparatus 120 according to a variety of programs. The CPU 901 may also be a microprocessor. The ROM 902 stores therein the programs, operational parameters, and the like that are used by the CPU 901. The RAM 903 temporarily stores therein the programs used and executed by the CPU 901, parameters appropriately varying in executing the programs, and the like. These are connected to each other through the host bus 904a configured of a CPU bus or the like.

The host bus 904a is connected to the external bus 904b such as a peripheral component interconnect/interface (PCI) bus through the bridge 904. Note that the host bus 904a, the bridge 904, and the external bus 904b do not have to be configured separately, and functions of these may be implemented by a single bus.

The input device 906 includes: an input unit for inputting information by a user, such as a mouse, a keyboard, a touch panel, buttons, a microphone, a switch, or a lever; an input control circuit generating input signals based on input by the user and outputting the signals to the CPU 901; and the like. The output device 907 includes: a display device such as a liquid crystal display (LCD) device, an organic light emitting diode (OLED) device, or a lamp; and an audio output device such as a speaker.

The storage device 908 is an example of a storage unit of the information processing apparatus 120 and is a device for storing data. The storage device 908 may include a storage medium, a recorder that records data in the storage medium, a reader that reads data from the storage medium, a deletion device that deletes data recorded in the storage medium, and the like. The storage device 908 is configured of, for example, a hard disk drive (HDD). The storage device 908 drives a hard disk and stores programs executed by the CPU 901 and a variety of data.

The drive 909 is a reader/writer and is built in or externally connected to the information processing apparatus 120. The drive 909 reads information recorded in the removable recording medium loaded in the drive 909 such as a magnetic disk, an optical disk, a magneto-optical disk, or a semiconductor memory, and outputs the information to the RAM 903.

The connection port 911 is an interface connected to an external device, and is a port of connection with the external device capable of transferring data through, for example, a universal serial bus (USB). The communication device 913 is a communication interface configured of a communication device or the like for connecting to, for example, the communication network 10. The communication device 913 may be a communication device supporting a wireless local area network (LAN), a communication device supporting a wireless USB, or a wired communication device that performs wired communication.

<7. Summary>

The configuration and iris authentication process of the authentication system 100 according to this embodiment have been described above. In the present technology, the pupil diameter (i.e., the size of the iris) of an authentication image used for authentication in iris authentication is controlled by changing the authentication UI, resulting in an increase in the accuracy of iris authentication and stable recognition. In other words, the accuracy of iris authentication can be improved by changing the display of the authentication UI, irrespective of the environment in which iris authentication is performed, at any time and in any environment. Therefore, an iris authentication process which is robust against a change in external environment and a change in illumination conditions, can be provided.

A plurality of authentication images are obtained by changing the display of the authentication UI. Therefore, even if one authentication image having a blurred image of an eye has been obtained, the authentication process can be performed using another authentication image, resulting in an increase in authentication accuracy. As a result, errors in authentication can be reduced, and therefore, a system to which a user is securely authenticated to log in can be provided.

The pupil diameter is changed using the authentication UI. Therefore, the authentication process can be performed without the need of an additional particular device and without causing a user to perform an arbitrary operation. The authentication UI is automatically changed, depending on the brightness of the environment or a previously obtained authentication image. Therefore, for example, even when a user is tired and their pupil in an obtained authentication image is small, the display control unit 126 changes the display of the authentication UI so that the pupil diameter of the user becomes larger, and therefore, the authentication process can be completed without the user's knowledge.

It should be understood by those skilled in the art that various modifications, combinations, sub-combinations and alterations may occur depending on design requirements and other factors insofar as they are within the scope of the appended claims or the equivalents thereof.

For example, the security level required by the authentication process varies depending on what is approved. For example, the security level required for social networking services (SNSs) or online shopping is higher than the security level required for logging in to a terminal, accessing shared information, etc. Also, a still higher security level is required for medical data.

Therefore, when the iris authentication process is performed, the security level may be set based on what is approved. For example, after a user has logged in to a smartphone, the security level is changed to a level higher than the security level which is used for logging in. As a result, when online shopping is performed using the smartphone, the authentication process is performed at a higher security level, whereby the safety can be maintained.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) An information processing apparatus including:

a display control unit configured to, when an authentication image including an iris of an eye of a user is obtained, cause a display unit to display an authentication UI for obtaining an authentication image with which it is easy to perform iris authentication.

(2) The information processing apparatus according to (1), wherein the display control unit changes a display of the authentication UI based on at least one of a brightness of an environment at a time of obtaining an authentication image or a size of a pupil in the obtained authentication image.

(3) The information processing apparatus according to (1) or (2), wherein
the display control unit changes a size of the authentication UI.

(4) The information processing apparatus according to any one of (1) to (3), wherein
the display control unit changes a brightness of the authentication UI.

(5) The information processing apparatus according to any one of (1) to (4), wherein
the display control unit changes a display position of the authentication UI.

(6) The information processing apparatus according to any one of (1) to (5), wherein
the display control unit moves the authentication UI upward in a display area.

(7) The information processing apparatus according to any one of (1) to (6), wherein
the display control unit changes a display of the authentication UI to show content in which the user is interested.

(8) The information processing apparatus according to any one of (1) to (7), further including:
an image processing unit configured to specify a pupil in the authentication image to obtain an iris; and
an authentication unit configured to perform iris authentication using the obtained iris of the authentication image.

(9) The information processing apparatus according to (8), wherein
the authentication unit performs iris authentication by referencing an authentication storage unit configured to store a previously obtained image of the iris of the user and thereby performing a matching process on the stored image and the authentication image.

(10) An eyewear terminal including:
an imaging unit configured to obtain an authentication image including an iris of an eye of a user;
a display unit configured to cover at least one of eyes of a user; and
a display control unit configured to, when the authentication image is obtained, cause the display unit to display an authentication UI for obtaining an authentication image with which it is easy to perform iris authentication.

(11) The eyewear terminal according to (10), wherein
when the eyewear terminal is worn by the user, the display control unit causes the display unit to display the authentication UI.

(12) An information processing method including:
causing, by a display control unit, when an authentication image including an iris of an eye of a user is obtained, a display unit to display an authentication UI for obtaining an authentication image with which it is easy to perform iris authentication.

(13) The information processing method according to (12), further including:
obtaining an authentication image including an iris of an eye of a user using an imaging unit; and
performing iris authentication based on the obtained iris using an authentication unit.

(14) The information processing method according to (13), further including:
obtaining a plurality of authentication images including irises having different sizes.

(15) An authentication system including:
a device including
an imaging unit configured to obtain an authentication image including an iris of an eye of a user, and
a display unit configured to cover at least one of eyes of the user; and
an information processing apparatus including
an authentication unit configured to perform iris authentication using the obtained iris of the authentication image, and
a display control unit configured to, when the authentication image is obtained, cause the display unit of the device to display an authentication UI for obtaining an authentication image with which it is easy to perform iris authentication.

What is claimed is:

1. An information processing apparatus comprising:
circuitry configured to:
when a first authentication image including an iris of an eye of a user is obtained, display an object on a display screen to perform iris authentication;
measure a size of a pupil in the eye of the obtained first authentication image;
change a shape of the object displayed on the display screen and obtain a second authentication image based on a measured brightness of an environment at a time of obtaining the first authentication image and the measured size of the pupil in the obtained first authentication image; and
perform the iris authentication using at least one of the first authentication image and the second authentication image according to the user's current situation.

2. The information processing apparatus according to claim 1, wherein
the circuitry is configured to change a size of the object based on at least one of the brightness of the environment at the time of obtaining the first authentication image or the size of the pupil in the obtained first authentication image.

3. The information processing apparatus according to claim 1, wherein
the circuitry is configured to change a brightness of the object based on the size of the pupil in the obtained first authentication image.

4. The information processing apparatus according to claim 1, wherein
the circuitry is configured to change a display position of the object on the display screen based on at least one of the brightness of the environment at the time of obtaining the first authentication image or the size of the pupil in the obtained first authentication image.

5. The information processing apparatus according to claim 1, wherein
the circuitry is configured to move the object upward in a display area of the display screen based on at least one of the brightness of the environment at the time of obtaining the first authentication image or the size of the pupil in the obtained first authentication image.

6. The information processing apparatus according to claim 1, wherein
the circuitry is configured to change a display of the object to show content in which the user is interested.

7. The information processing apparatus according to claim 1, wherein the circuitry is configured to:
specify a pupil in the first authentication image to obtain the iris; and
perform said iris authentication using the obtained iris of the first authentication image.

8. The information processing apparatus according to claim 7, wherein
the circuitry is configured to perform said iris authentication by referencing a memory that stores a previously obtained image of the iris of the user and by performing a matching process between the previously obtained image and the first authentication image.

9. The information processing apparatus according to claim 1, wherein the circuitry is configured to obtain a plurality of authentication images until a predetermined threshold value is reached.

10. The information processing apparatus according to claim 9, wherein each of the plurality of authentication images includes a different pupil size of the user.

11. The information processing apparatus according to claim 9, wherein the circuitry is configured to change a display of the object until the predetermined threshold value is reached.

12. The information processing apparatus according to claim 1, wherein the circuitry is configured to modify a luminance value of the object based on the brightness of the environment.

13. The information processing apparatus according to claim 1, wherein
the circuitry is configured to change a color of the object based on at least one of the brightness of the environment at the time of obtaining the first authentication image or the size of the pupil in the obtained first authentication image.

14. The information processing apparatus according to claim 1, wherein the circuitry is configured to change the shape of the object displayed on the display screen and obtain the second authentication image based on the brightness of the environment at the time of obtaining the first authentication image and the measured size of the pupil in the obtained first authentication image.

15. An eyewear terminal comprising:
a display screen configured to cover an eye of a user; and
circuitry configured to:
obtain a first authentication image including an iris of the eye of the user;
when the first authentication image is obtained, display an object on the display screen to perform iris authentication;
measure a size of a pupil in the eye of the obtained first authentication image;
change a shape of the object displayed on the display screen and obtain a second authentication image based on a measured brightness of an environment at a time of obtaining the first authentication image and the measured size of the pupil in the obtained first authentication image; and
perform the iris authentication using at least one of the first authentication image and the second authentication image according to the user's current situation.

16. The eyewear terminal according to claim 15, wherein
when the eyewear terminal is worn by the user, the circuitry is configured to display the object on the display screen.

17. An information processing method comprising:
when a first authentication image including an iris of an eye of a user is obtained, displaying an object on a display screen to perform iris authentication;
measuring a size of a pupil in the eye of the obtained first authentication image;
changing a shape of the object displayed on the display screen and obtaining a second authentication image based on of a measured brightness of an environment at a time of obtaining the first authentication image and the measured size of the pupil in the obtained first authentication image; and
performing the iris authentication using at least one of the first authentication image and the second authentication image according to the user's current situation.

18. The information processing method according to claim 17, further comprising:
obtaining the first authentication image including the iris of the eye of the user; and
performing said iris authentication based on the obtained iris.

19. The information processing method according to claim 18, further comprising:
obtaining a plurality of authentication images including irises having different sizes.

20. An authentication system comprising:
a display screen configured to cover an eye of a user; and
circuitry configured to:
obtain a first authentication image including an iris of the eye of the user;
perform iris authentication using the obtained iris of the first authentication image;
when the first authentication image is obtained, display an object on the display screen to perform said iris authentication;
measure a size of a pupil in the obtained first authentication image;
change a shape of the object displayed on the display screen and obtain a second authentication image based on of a measured brightness of an environment at a time of obtaining the first authentication image and the measured size of the pupil in the obtained first authentication image; and
perform the iris authentication using at least one of the first authentication image and the second authentication image according to the user's current situation.

* * * * *